(12) United States Patent
Berger et al.

(10) Patent No.: US 12,309,274 B2
(45) Date of Patent: May 20, 2025

(54) CRYPTOGRAPHY-AS-A-SERVICE

(71) Applicant: Capital One Services, LLC, McLean, VA (US)

(72) Inventors: Andrew Berger, Dayton, OH (US); Ashish Gupta, Richmond, VA (US); Marek Bazler, Glen Allen, VA (US); Bharath Bhushan Sreeravindra, Sunnyvale, CA (US); Hao Cheng, Oakton, VA (US)

(73) Assignee: Capital One Services, LLC, McLean, VA (US)

( * ) Notice: Subject to any disclaimer, the term of this patent is extended or adjusted under 35 U.S.C. 154(b) by 54 days.

(21) Appl. No.: 17/878,968

(22) Filed: Aug. 2, 2022

(65) Prior Publication Data
US 2024/0048380 A1 Feb. 8, 2024

(51) Int. Cl.
| | |
|---|---|
| *H04L 9/32* | (2006.01) |
| *G06F 9/54* | (2006.01) |
| *H04L 9/08* | (2006.01) |
| *H04L 9/30* | (2006.01) |

(52) U.S. Cl.
CPC .............. *H04L 9/321* (2013.01); *G06F 9/547* (2013.01); *H04L 9/0891* (2013.01); *H04L 9/3073* (2013.01)

(58) Field of Classification Search
CPC ..... H04L 9/321; H04L 9/0891; H04L 9/3073; H04L 9/3247; H04L 9/50; G06F 9/547
See application file for complete search history.

(56) References Cited

U.S. PATENT DOCUMENTS

| | | |
|---|---|---|
| 10,891,366 B1 | 1/2021 | Wu et al. |
| 11,750,566 B1 | 9/2023 | Montilla Lugo |
| 2004/0019787 A1* | 1/2004 | Shibata ................. H04L 63/045 713/168 |
| 2004/0064710 A1* | 4/2004 | Vainstein ............ G06F 21/6218 705/51 |
| 2013/0073852 A1 | 3/2013 | Oba et al. |
| 2013/0103785 A1* | 4/2013 | Lyon .................. H04N 21/2385 709/217 |
| 2013/0275752 A1 | 10/2013 | Zhang et al. |

(Continued)

FOREIGN PATENT DOCUMENTS

EP 4014425 A1 6/2022

OTHER PUBLICATIONS

Jones "JSON Web Key (JWK)", Internet Engineering Task Force (IETF), RFC 7157, ISSN 2070-1721, Microsoft, May 2015, printed Jan. 4, 2023, pp. 1-40, <https://www.rfc-editor.org/rfc/rfc7517>.

(Continued)

*Primary Examiner* — Maung T Lwin
*Assistant Examiner* — Judy Bazna
(74) *Attorney, Agent, or Firm* — Banner & Witcoff, Ltd.

(57) ABSTRACT

Systems and methods, as described herein, may comprise and/or utilize data governance systems to enable end-to-end encrypted communications between an organization and third parties as well as between systems internal to the organization. The data governance systems may enforce compliance with an organization's data governance policies, as well as various laws, rules, and/or policies, for encrypted communications and/or other encrypted data payloads.

22 Claims, 11 Drawing Sheets

(56) References Cited

U.S. PATENT DOCUMENTS

| | | | | |
|---|---|---|---|---|
| 2016/0094521 | A1* | 3/2016 | Rao | H04L 63/0428 |
| | | | | 713/171 |
| 2018/0063103 | A1 | 3/2018 | Jahid et al. | |
| 2018/0316505 | A1 | 11/2018 | Cohen et al. | |
| 2019/0097791 | A1 | 3/2019 | Hersans et al. | |
| 2019/0132120 | A1* | 5/2019 | Zhang | H04L 63/0428 |
| 2019/0190718 | A1 | 6/2019 | Wease et al. | |
| 2019/0306132 | A1* | 10/2019 | Le Van Gong | H04L 9/0891 |
| 2019/0342079 | A1* | 11/2019 | Rudzitis | G06F 21/602 |
| 2019/0370790 | A1* | 12/2019 | Spector | H04L 9/3271 |
| 2020/0053065 | A1 | 2/2020 | Wisniewski et al. | |
| 2020/0177383 | A1 | 6/2020 | Iyer et al. | |
| 2020/0204558 | A1* | 6/2020 | Kurmi | H04L 63/101 |
| 2020/0323030 | A1* | 10/2020 | Mehta | H04W 84/18 |
| 2020/0366467 | A1 | 11/2020 | Kim et al. | |
| 2021/0385201 | A1 | 12/2021 | Saint | |
| 2022/0094530 | A1 | 3/2022 | Sreeravindra | |
| 2022/0166623 | A1 | 5/2022 | Alfonso Reyes et al. | |
| 2022/0179972 | A1 | 6/2022 | Sah | |
| 2022/0353247 | A1 | 11/2022 | Bastos et al. | |
| 2023/0318903 | A1* | 10/2023 | Ye | H04L 1/16 |
| | | | | 709/223 |

OTHER PUBLICATIONS

Jones "JSON Web Algorithms (JWA)", Internet Engineering Task Force (IETF), RFC 7518, ISSN 2070-1721, Microsoft, May 2015, printed Jan. 4, 2023, pp. 1-69, <https://www.rfc-editor.org/rfc/rfc7518#section-3>.

Jones et al. "JSON Web Signature (JWS)", Internet Engineering Task Force (IETF), RFC 7515, ISSN 2070-1721, Microsoft/Ping Identity, NRI, May 2015, printed Jan. 4, 2023, pp. 1-59, <https://www.rfc-editor.org/rfc/rfc7515>.

Jones et al. "JSON Web Encryption (JWE)", Internet Engineering Task Force (IETF), RFC 7516, ISSN 2070-1721, Microsoft/Cisco, May 2015, printed Jan. 5, 2023, pp. 1-51, <https://www.rfc-editor.org/rfc/rfc7516>.

McGrew et al. "Fundamental Elliptic Curve Cryptography Algorithms" Internet Engineering Task Force (IETF), RFC 6090, ISSN 2070-1721, Cisco Systems/National Security Agency, Feb. 2011, printed Jan. 5, 2023, pp. 1-34, <https://www.rfc-editor.org/rfc/rfc6090>.

Hahn "Evolving API Pagination at Slack", printed on Jan. 5, 2023, pp. 1-15, <https://slack.engineering/evolving-api-pagination-at-slack/>.

Rcls "How to Implement Slack's cursor based pagination spec with DynamoDB", Feb. 10, 2021, printed on Jan. 5, 2023, pp. 1-6, <https://rcls.medium.com/how-to-implement-slacks-cursor-based-pagination-spec-with-dynamodb-3ed08ef12297>.

Godaddy/Asherah, printed Jan. 5, 2023, pp. 1-5, <https://github.com/godaddy/asherah>.

Oct. 23, 2023—(WO) Provisional Opinion Accompanying the Partial Search Result—PCT/US2023/028771.

\* cited by examiner

CRYPTOGRAPHY-AS-A-SERVICE

CROSS REFERENCE TO RELATED APPLICATIONS

This application is related to the following U.S. Patent Applications: U.S. application Ser. No. 17/878,955 filed on Aug. 2, 2022, entitled "Data Exchange Protection and Governance System" and U.S. application Ser. No. 17/878,893 filed on Aug. 2, 2022, entitled "Key Management for Cryptography-as-a-Service and Data Governance Systems." Each of the related applications is incorporated by reference herein in its entirety for all purposes.

FIELD OF USE

Aspects of the disclosure generally relate to data governance in cryptography and more specifically enforcement of rules and regulations on encrypted data.

BACKGROUND

Data governance is a collection of processes and standards for controlling information in an organization. Data control may include encryption of data and other functions related to cryptography. Data governance may therefore also include the management and control of cryptographic keys related to the encryption and decryption of data used in an organization. However, encryption, and other security protocols, may make it difficult to comply with data governance policies, as well as various laws, regulations, and policies.

Aspects described herein may address these and other problems with data governance, and generally improve the quality, efficiency, and security of data governance, cryptographic related services, and cryptographic key management for organizations.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

Systems and methods, as described herein, may comprise and/or utilize data governance systems to enable end-to-end encrypted communications between an organization and third parties as well as between systems internal to the organization. The data governance systems described herein may enforce compliance with an organization's data governance policies, as well as various laws, rules, and/or policies, for encrypted communications and/or other encrypted data payloads. Data governance systems may include Policy Decision Point systems. Other systems that may utilize end-to-end encrypted communications and/or enforce compliance with an organization's data governance policies may include Policy Management Systems, Policy Enforcement Point Systems, and the like.

Systems and methods, as further described herein, may comprise and/or utilize cryptography-as-a-service components. The cryptography-as-a-service components may perform cryptographic operations, such as encryption, digital signing, and the like, without needing to take possession of some or all of the cryptographic keys involved directly on a user device. This allows for utilization of functions such as encryption, decryption, signing, verifying, and the like without the risk of users having to self-manage cryptographic secrets. Cryptography-as-a-service components may support various systems as described herein. For example, compliance with various laws, rules, and/or policies for encrypted and digitally signed communications or other encrypted data payloads may take advantage of having access to the cryptography-as-a-service components.

Systems and methods, as further described herein, may comprise and/or utilize key management service components. Key management server (e.g., key management software-as-a-service) may support the data governance services as well as cryptography-as-a-service components, allowing for key management, key specification management, and the like. Key management server may also add the functionality of controlling the timing of key generation and rotation.

A system may comprise a data protection service, an internal gateway, an external gateway, a hardware security module (HSM) and a crypto key lockbox service. The data protection service may comprise a cryptography-as-a-service application programming interface (API), a cryptographic key management API, and a key rotation service and a key metadata database. The internal gateway may be configured to authenticate internal users and to allow one or more internal users, via an internal interface, to create, use, and retrieve cryptographic key pairs using the key rotation service and the key metadata database by accessing at least one of the cryptography-as-a-service API or the cryptographic key management API. The external gateway may be configured to authenticate external users and to allow one or more external users, via an external interface, to retrieve public keys by accessing the cryptography-as-a-service API. The HSM may be configured to interact with the key rotation service and the cryptography-as-a-service API. The crypto key lockbox service may be configured to interact with the key rotation service, the cryptography-as-a-service API and the cryptography key management API.

In some implementations, the data protection service is further configured to receive a request from a user to access the cryptography key management API, authenticate the user as an internal user, and access the cryptography key management API based on the request. In some implementations, the data protection service is further configured to receive a request from a user, authenticate the user as an external user, and access the cryptography-as-a-service API based on the request. In some implementations, the data protection service is further configured to receive a request from a user to access the cryptography key management API, authenticate the user as an external user, and generate an access error based on the request. The cryptography-as-a-service API may be configured to provide access to one of an encryption service or a digital signing service. In some implementations, the cryptographic key management API may be configured to allow updates to a key management setting or policy that changes a functionality of the cryptography-as-a-service API. In some implementations, the cryptographic key management API may be configured to allow updates to a key management setting or policy that changes a compliance enforcement of at least one of a law, regulation, or organizational policy. In some implementations, the cryptographic key management API may be configured to allow updates to a key management setting or policy that changes a time period where a functionality of the cryptography-as-a-service API may be accessed. The time period for an internal user may be longer than that of an external user. The time period may be session based such that the functionality of the cryptography-as-a-service API may be accessed during the session. The session may be authorized to allow a subset of cryptographic operations of the cryptography-as-a-service API of all available cryptographic operations.

A computer-implemented method may comprise receiving, by a computing system and from a user device, a request to access a cryptography-as-a-service; determining, by the computing system, whether the request to access the cryptography-as-a-service was received via an internal gateway or an external gateway; providing, via the cryptography-as-a-service and based on a determination that the request was received via the internal gateway, access to the cryptography-as-a-service API; receiving, from the user device and by the cryptography-as-a-service API, a request to perform a cryptographic operation; retrieving, from a secure memory and based on the request to perform the cryptographic operation, one or more encryption keys; performing the cryptographic operation using the one or more encryption keys; determining, based on the performing the cryptographic operation, that the one or more encryption keys should be updated; updating, using a key rotation service, the one or more encryption keys; and storing the one or more updated encryption keys in the secure memory. The internal gateway may be configured to authenticate internal users and to allow one or more internal users, via an internal interface, to create, use, and retrieve cryptographic key pairs by accessing at least one of a cryptography-as-a-service application programming interface (API) or a cryptographic key management API. The external gateway may be configured to authenticate external users and to allow one or more external users, via an external interface, to retrieve public keys by accessing the cryptographic key management API.

In some implementations, the method may further comprise receiving, by the computing system and from the user device, a second request to access cryptography key management; and providing, via the cryptography-as-a-service and based on a determination that the request was received via the internal gateway, access to the cryptographic key management API. In some implementations, the method may further comprise receiving, by the computing system and from a second user device, a second request to access the cryptography-as-a-service; and providing, via the cryptography-as-a-service and based on a determination that the second request was received via the external gateway, access to the cryptography-as-a-service API. In some implementations, the method may further comprise receiving, by the computing system and from a second user device, a second request to access cryptography key management; and generating an access error by a data protection service based on a determination that the second request was received via the external gateway. In some implementations, the method may further comprise providing access, by the cryptography-as-a-service API, to one of an encryption service or a digital signing service.

In some implementations, a non-transitory computer-readable storage medium may comprise instructions. The instructions, when executed, may cause a computing system to execute the steps of any of the methods described above.

These features, along with many others, are discussed in greater detail below.

BRIEF DESCRIPTION OF THE DRAWINGS

The present disclosure is described by way of example and not limited in the accompanying figures in which like reference numerals indicate similar elements and in which.

DETAILED DESCRIPTION

Figure 1:
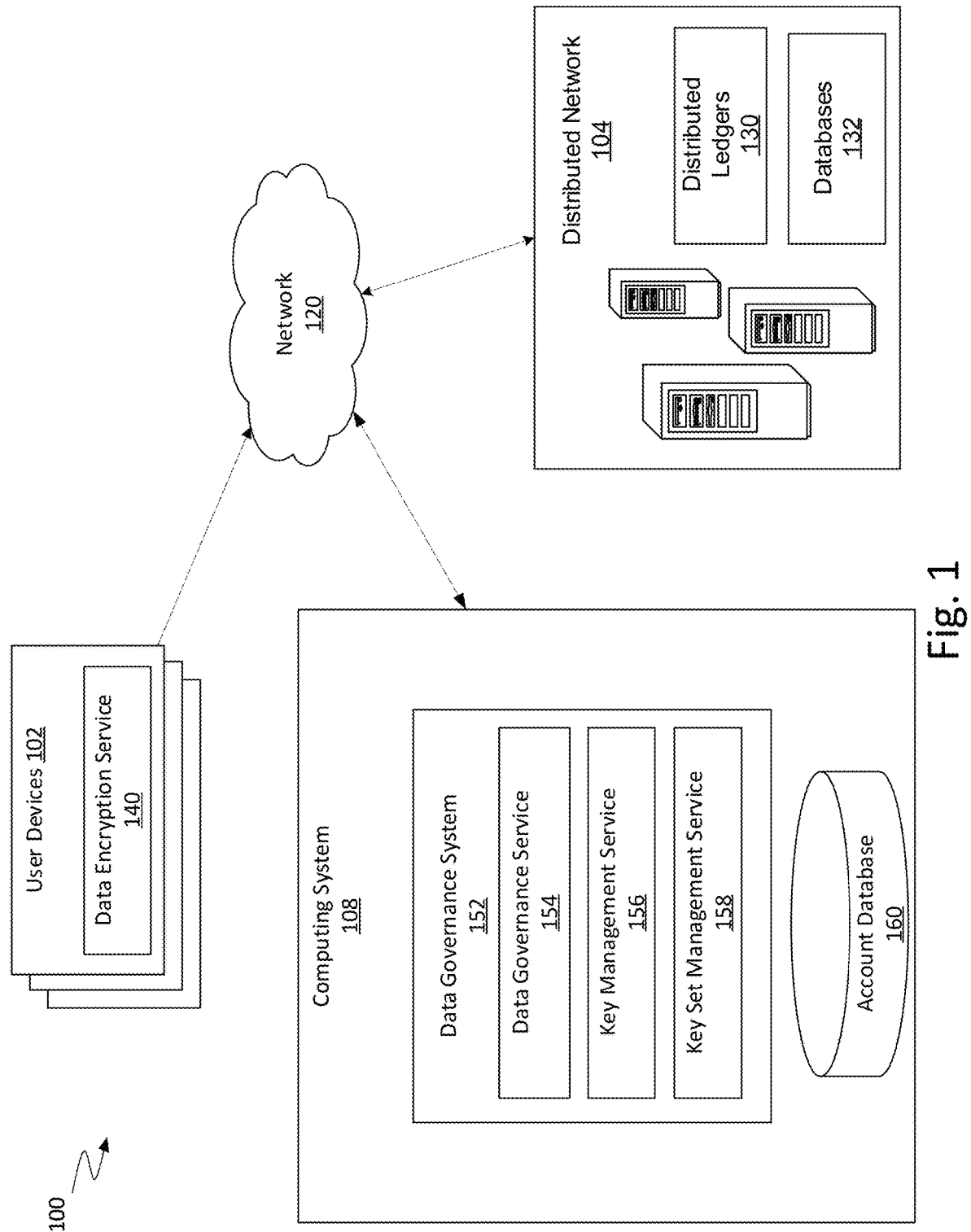
FIG. 1 depicts an illustrative data governance system that may be used in accordance with one or more illustrative aspects described herein.

In the following description of the various embodiments, reference is made to the accompanying drawings, which form a part hereof, and in which is shown by way of illustration, various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects discussed herein may relate to methods, techniques, and infrastructure for data governance systems. The data governance systems herein allow for cryptographic functions to be enabled that allow for end-to-end encrypted communications between an organization and third-party organizations or individuals, as well as between systems internal to the organization. The data governance systems may facilitate management of cryptographic secrets to enable their use in a standardized way such that they are properly generated, stored, transmitted, handled, used, rotated, and/or even destroyed.

The methods, techniques and infrastructure herein further extend rule and policy enforcement, including real-time rule and policy enforcement, as well as analysis, to encrypted communications and data, which would otherwise not be possible, including audit logging, legal compliance, regulatory compliance, policy compliance, data loss prevention, and the like. Encrypted messages and other data payloads cannot be audited to ensure compliance with laws, rules, and/or policies without access to the corresponding decryption keys (e.g., private keys, a symmetric key, etc.). These methods, techniques and infrastructure described herein may cover gaps that may exist in areas such as regulatory compliance and data loss prevention due to the nature of encrypted communications.

Aspects discussed herein may further relate to methods, techniques, and infrastructure for cryptography-as-a-service. Cryptography-as-a-service may be a cloud-based solution or an on-premise solution that includes a plurality of components. The plurality of components may perform cryptographic operations, such as encryption, digital signing, and the like without needing to take possession of some or all of the cryptographic keys involved directly on a user device. Cryptography-as-a-service components may also include functions related to security such as enabling a time-based crypto-period. For example, a time-based crypto-period may allow users access to functions such as encryption or digital signing for a limited period of time. In another example, a time-based crypto-period may allow users access to functions such as encryption or digital signing during certain windows of time. Access may be session based, such that the functions are available during a session, resulting in a session-based crypto-period. Sessions may be authorized to allow a subset of cryptographic operations or access to all available cryptographic operations.

Cryptography-as-a-service components may also include functions related to security such as enabling usage-based limits on cryptographic functions. For example, a limit may be set to a number of operations that a given cryptographic key is allowed to perform.

Further, the systems and methods described herein may also take advantage of the cryptography-as-a-service to enforce compliance with various laws, rules, and/or policies for those encrypted and digitally signed communications or other encrypted data payloads. For example, an intermediary, such as a gateway, may intercept an encrypted communication. The intermediary may invoke the cryptograph-as-a-service to decrypt the encrypted communication. Once decrypted, the intermediary may compare the communication to one or more policies to ensure that the communication complies with laws, rules, and/or policies. If the communication is compliant, the intermediary may invoke the cryptograph-as-a-service to re-encrypt the communication. After the communication has been re-encrypted, the intermediary may forward the re-encrypted communication toward its destination. By invoking the cryptography-as-a-service, the intermediary may ensure that encrypted communications comply with federal and state laws and regulations, as well as corporate data governance policies.

Further, the systems and methods allow for the use of the latest cryptographic standards in a way that is seamless to a user. For example, when a request is received for a cryptographic service, a cryptographic standard may be chosen based on the request and accompanying unencrypted data. The cryptographic service may then be applied to the unencrypted data based on the standard.

Systems and methods, as further described herein, may comprise and/or utilize a key management service. The key management service may be a cloud-based service, on-premise service, or a hybrid service. Key management service may comprise a plurality of components that support data loss prevention systems, key generation, key updating, key revocation, key deletion, and the like. Key management service components may be at the enterprise level, allowing systems and users to create and/or store cryptographic objects, including symmetric keys, asymmetric keys, SSH keys, PGP keys, generic secrets such as passwords, and the like. Key management service components also may add the functionality of controlling the timing of key generation and rotation.

Key management service components may keep secure secrets, such as cryptographic keys, passwords, and the like. The key management service components may manage the lifecycle of such cryptographic keys and passwords. Further, the key management service components may manage the revocation, archiving, and/or destruction of secrets such as cryptographic keys, passwords, and the like. In some implementations, the key management service components abstract away the management of managing secrets to increase security seamlessly. The system may make keys available to internal and external users according to aspects of public key infrastructure (PKI).

The systems and methods described herein may improve the functioning of computer systems by implementing data governance systems and functions, cryptography-as-a-service systems and functions, and key management functions and systems, implementing these systems and functions without exposing cryptographic secrets unnecessarily, and enabling enforcement of compliance related to laws, regulations, and/or policies.

Data Governance Systems

Turning to FIG. 1, a system 100 is depicted that may include one or more user devices 102, a computing system 108, a distributed network 104, and a network 120. The one or more user devices 102, computing system 108, and/or the distributed network 104 may be communicatively connected to each other through the network 120. The network 120 may include the Internet, inclusive of the mobile Internet, as well as alternately or in addition a LAN (local area network), a WAN (wide area network), telephone network (Public Switched Telephone Network (PSTN), Session Initiation Protocol (SIP), wireless network, point-to-point network, star network, token ring network, hub network, via protocols such as EDGE, 3G, 4G LTE, Wi-Fi, 5G and WiMAX. Additionally, a variety of authorization and authentication techniques, such as username/password, Open Authorization (OAuth), Kerberos, Secured, digital certificates, and more, may be used to secure the communications. It will be appreciated that the network connections shown in the system 100 are illustrative, and any means of establishing a communications link between the components, devices, or systems may be used. The data transferred to and from various components, devices, or systems in the system 100 may include secure and sensitive data, such as confidential documents, customer personally identifiable information, and account data. Therefore, it may be desirable to protect the transmissions of such data using secure network protocols and encryption, and/or to protect the integrity of the data when stored on the various devices.

The one or more user devices 102 may be one or more devices, such as a cellular phone, a mobile phone, a smart phone, a tablet, a laptop, or a computing device, like a desktop computer, laptop computer, or, alternatively, a virtual computer. The one or more user devices 102 may be configured to provide a user access to various applications and services. For example, one of the one or more user devices 102 may provide a user with access to the Internet. Additionally, one of the one or more user devices 102 may provide a user with one or more applications located thereon. The one or more applications may provide the user with a plurality of tools and access to a variety of services. In some embodiments, the one or more applications may include a data encryption service 140. The data encryption service 140 may be an application, or executable (e.g., API), configured to invoke the functionality described herein. The one or more user devices 102 may be internal to an organization. For example, the one or more user devices 102 may be communicating over an internal network to provide access to the various applications and services. In some implementations, the one or more user devices 102 are associated with a line of business (LOB) of the organization.

Computing system 108 may be a stand-alone server, a corporate server, a server located in a server farm or cloud-computer environment, or a virtual server hosted on hardware capable of supporting a plurality of virtual servers. Computing system 108 may be associated with an organization or company. In some implementations, computing system 108 may be associated with a financial institution, such as a bank, a brokerage house, an investment firm, an exchange platform or the like. Computing system 108 may include a data governance system 152 and an account database 160. The data governance system 152 may include a data governance service 154, a key management service 156, and/or a key set management service 158 for providing one or more functions. The one or more functions may be performed by other components as described in computing system 108 and by a combination of one or more components of computing system 108.

The data governance service 154 may be configured to review (analyze) one or more communications (e.g., encrypted communications, plaintext communications, decrypted communications) to ensure that the one or more communications comply with federal and state laws and regulations, as well as data governance policies of the organization. Although not shown in FIG. 1, the data governance service 154 may include a key generation service—such as key generation service 310 (e.g., as part of the key management service 156 in some implementations), a compliance service—such as compliance service 320, a gateway—such as gateway 325, and/or a secure memory—such as secure memory 330. Key management service 156, compliance service 320, and secure memory 330 are described in greater detail below in FIG. 3.

The key management service 156 may be configured to allow access to cryptographic operations, such as encryption operations, signature operations, and/or combined operations. In some implementations, encryption operations may be performed with a managed public key or an unmanaged public key. For example, encryption may be performed with an unmanaged public key if the intended destination of the encrypted data is an external party. In some implementations, decryption may be performed using a key that is a managed private key.

In some implementations, signature operations may include signing and verifying operations. For example, signing operations may include asymmetric cryptography digital signatures created with a managed private key. Signatures may optionally be created and tagged with an intended recipient. For example, the intended recipient's name and/or address such as a destination address may be prepended to a data payload before a signature is created. In another example, verification operations may include asymmetric cryptography digital signatures verified with a managed public key or an unmanaged public key. Unmanaged public keys may be used for verification if the intended destination and/or recipient is an external party. In some implementations, signatures created with an intended recipient tag first verify that the intended recipient is correct.

In some implementations, combined operations are not performed in separate steps but instead are called together to receive a single result. For example, encryption and signing are called together for a cryptographic operation that results in a signed and encrypted data payload.

The key set management service 158 may be configured to create key sets, list key sets, get key sets, delete key sets, create managed keys, list managed keys, list managed keys in a key set, get managed key details, list managed key instances, update managed key details, and delete managed keys. Key sets may be a collection of related key specifications and key instances. A key specification may be a set of characteristics from which a cryptographic key may be generated. Key sets and key specifications are discussed in more detail below.

The account database 160 may be configured to store account information. The account information may store an indicator of one or more users associated with one or more user devices (e.g., user devices 102). The one or more users may be associated with one or more accounts accessible by a computing system (e.g., computing system 108). Account database 160 may include, but is not limited to relational databases, hierarchical databases, distributed databases, in-memory databases, flat file databases, XML databases, NoSQL databases, graph databases, and/or a combination thereof.

Distributed network 104 may include distributed ledgers 130 and/or databases 132. The various components of distributed network 104 may be configured to perform one or more functions as described herein. The one or more functions may be performed by other components as described in distributed network 104 and by a combination of one or more components of distributed network 104. The distributed network 104 may comprise a plurality of nodes that store and/or modify distributed ledgers 130 once consensus of the transaction is reached among the plurality of nodes using a consensus algorithm. A distributed ledger in distributed network 104 may store transactions (e.g., cryptocurrency transactions) executed by computing systems. A distributed network may be publicly accessible and/or have restricted access. The distributed network 104 may comprise one or more distributed ledger data structures comprising a blockchain. This distributed ledger data structure may be replicated among some or all of the nodes in the distributed network 104. Blockchain transactions or records may be time-stamped and bundled into blocks where each block is identified by its cryptographic hash called the consensus proof. The consensus proof may be determined by performing complex cryptographic computations with a consensus algorithm. In some implementations, the consensus proof may be determined by any consensus algorithm including proof of stake and the like. The distributed ledger data structure may be a mutation-resistant and/or durable data structure which maintains records of the blockchain transactions that are tamper-resistant. Once a blockchain transaction is recorded and verified in a block, it cannot be altered or deleted.

Some or all of the data and transactions related to system 100 in FIG. 1 may be stored using one or more databases 132 in the distributed network 104. Databases may include but are not limited to relational databases, hierarchical databases, distributed databases, in-memory databases, flat file databases, XML databases, NoSQL databases, graph databases, and/or a combination thereof.

Figure 2:
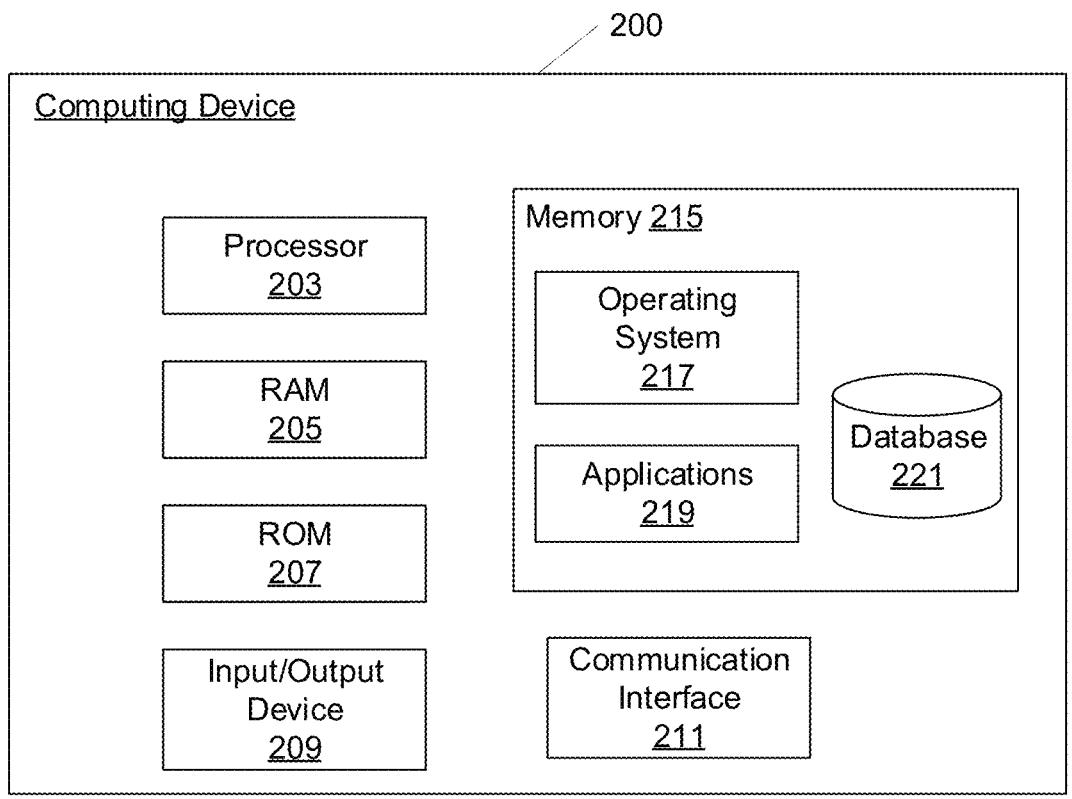
FIG. 2 depicts an illustrative computing system architecture that may be used in accordance with one or more illustrative aspects described herein.

Turning now to FIG. 2, a computing device 200 that may be used with one or more of the computational systems is described. The computing device 200 may include a processor 203 for controlling the overall operation of the computing device 200 and its associated components, including RAM 205, ROM 207, input/output device 209, communication interface 211, and/or memory 215. A data bus may interconnect processor(s) 203, RAM 205, ROM 207, memory 215, I/O device 209, and/or communication interface 211. In some embodiments, computing device 200 may represent, be incorporated in, and/or include various devices such as a desktop computer, a computer server, a mobile device, such as a laptop computer, a tablet computer, a smartphone, any other types of mobile computing devices, and the like, and/or any other type of data processing device.

Input/output (I/O) device 209 may include a microphone, keypad, touch screen, and/or stylus through which a user of the computing device 200 may provide input, and may also include one or more of a speaker for providing audio output and a video display device for providing textual, audiovisual, and/or graphical output. Software may be stored within memory 215 to provide instructions to processor 203, allowing computing device 200 to perform various actions. Memory 215 may store software used by the computing device 200, such as an operating system 217, application programs 219, and/or an associated internal database 221. The various hardware memory units in memory 215 may include volatile and nonvolatile, removable and non-removable media implemented in any method or technology for storage of information such as computer-readable instructions, data structures, program modules, or other data. Memory 215 may include one or more physical persistent memory devices and/or one or more non-persistent memory devices. Memory 215 may include, but is not limited to, random access memory (RAM) 205, read-only memory (ROM) 207, electronically erasable programmable read-only memory (EEPROM), flash memory or other memory technology, optical disk storage, magnetic cassettes, magnetic tape, magnetic disk storage or other magnetic storage devices, or any other medium that may be used to store the desired information and that may be accessed by processor 203.

Communication interface 211 may include one or more transceivers, digital signal processors, and/or additional circuitry and software for communicating via any network, wired or wireless, using any protocol as described herein.

Processor 203 may include a single central processing unit (CPU), which may be a single-core or multi-core processor, or may include multiple CPUs. Processor(s) 203 and associated components may allow the computing device 200 to execute a series of computer-readable instructions to perform some or all of the processes described herein. Although not shown in FIG. 2, various elements within memory 215 or other components in computing device 200, may include one or more caches including, but not limited to, CPU caches used by the processor 203, page caches used by the operating system 217, disk caches of a hard drive, and/or database caches used to cache content from database 221. For embodiments including a CPU cache, the CPU cache may be used by one or more processors 203 to reduce memory latency and access time. A processor 203 may retrieve data from or write data to the CPU cache rather than reading/writing to memory 215, which may improve the speed of these operations. In some examples, a database cache may be created in which certain data from a database 221 is cached in a separate smaller database in a memory separate from the database, such as in RAM 205 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of computing device 200 are described separately, the functionality of the various components may be combined and/or performed by a single component and/or multiple computing devices in communication without departing from the invention.

Data Governance Service

Figure 3:
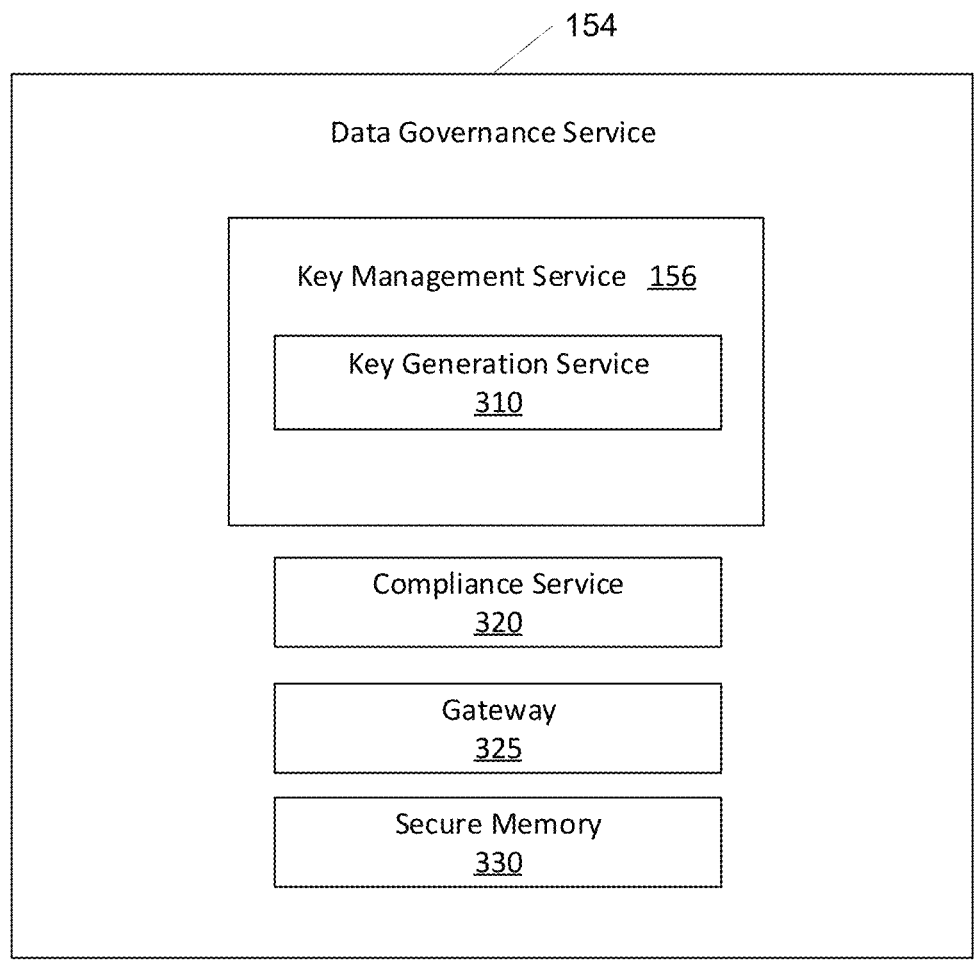
FIG. 3 depicts a data governance server (e.g., a data governance software-as-a-service executing on a server) that may be used in accordance with one or more illustrative aspects described herein.

In FIG. 3, the data governance service 154 is depicted and may include one or more of a key generation service 310 (e.g., as part of key management service 156 in some implementations), a compliance service 320, a gateway 325 and/or a secure memory 330. The key generation service 310 may be configured to generate one or more encryption keys. The one or more encryption keys may comprise an asymmetric key pair comprising a private key and a public key. The asymmetric key pair may be generated using RSA, ECC, or any other suitable asymmetric key generation function. Additionally or alternatively, the one or more encryption keys may comprise a symmetric key. The symmetric key may be generated according to a key derivation function. The one or more encryption keys may be used to encrypt data, decrypt data, generate digital signatures, verify digital signatures and/or other cryptographic functions.

The compliance service 320 may be configured to verify that communications (e.g., encrypted communications or other encrypted payloads) comply with state and/or federal laws and regulations, as well as data governance policies of an organization. In some implementations, the compliance service 320 may be configured to analyze the contents of a decrypted version of the encrypted communication or encrypted payload. In some implementations, decryption may comprise having access to the decryption key for accomplishing the decryption. The decryption key may have to be derived. For example, the decryption key may be derived using a private key corresponding to the public key sent to a device encrypting the communication or encrypted payload. In some examples, compliance with a law, rule, regulation, or policy may require logging of at least a portion of the contents of an encrypted communication or data payload for audit purposes. Compliance may include logging at least the portion of the contents. In another example, legal compliance may require analyzing the unencrypted version of a data payload that is a communication and legal compliance cannot be ascertained until the unencrypted communication is analyzed. In another example, policy compliance may require that a content of a communication and/or data payload be analyzed to deter data loss. In another example, the communication or data payload may have to comply with a legal requirement. In another example, the communication or data payload may have to comply with a regulatory requirement. In a further example, the communication or data payload may have to comply with a policy from a set of policies. The policies may be required internally by a company or other organization or externally. The relevant law, regulation, or policy may depend on the type of or content of the decrypted communication or other data payload. In some implementations, the relevant law, regulation, or policy may be cross-referenced in a database or otherwise determined based on the type of or content of the decrypted communication. In some implementations, metadata may be read from the decrypted communication or payload or accompanying the decrypted communication or payload to determine the relevant law, regulation, and/or policy.

The compliance service 320 may be configured to check compliance of an authenticated communication or other data payload. In some implementations, determining whether the decrypted communication or other data payload complies with laws, regulations, and/or policies may include analyzing a formatting of the authenticated communication or data payload. In some implementations, determining whether the authenticated communication or other data payload follows laws, regulations, and/or policies may include analyzing the contents of the authenticated communication or data payload. The compliance service 320 may review the compliance of the authenticated communication or other data payload and log data as appropriate for at least the reasons described above.

The gateway 325 may be configured to perform gateway functions when interfacing with one or more internal and/or external users. In some implementations, gateway 325 may also be configured for policy enforcement (e.g., enforcing policy instructions). For example, policy instructions may be issued by compliance service 320. The gateway may comprise one or more external gateways and/or one more internal gateways. An external gateway may be configured to interface with external user devices. In some implementations, external gateways may be configured to allow access to APIs and/or other functionality associated with at least some cryptographic services. External user devices may have access to fewer services than internal users. An internal gateway may be configured to interface with internal devices and/or applications. For example, internal gateways may be configured to interface with internal devices and/or applications of an organization. The internal devices and/or applications may communicate via a secure network. In some implementations, internal gateways may be configured to allow access to APIs and/or other functionality associated with key management and cryptographic services. Internal devices and/or applications may have more access to more than external devices. For example, internal devices and/or applications may have access to symmetric key cryptography as the communications and other data payloads stay internal to the organization.

The secure memory 330 may be configured to securely store encryption keys (e.g., symmetric keys, asymmetric key pairs, private keys individually, public keys individually, etc.) and/or other secrets. In some implementations, the secure memory 330 may be configured to allow limited access from functions and applications located on a computing system comprising the secure memory to the secrets. Secure memory 330 may encrypt the secrets to keep them secure. The secure memory 330 may be configured to provide an interface to manage and control secrets stored within the secure memory. In some implementations, secure memory 330 may keep and store audit logs of accesses to secrets. In some implementations, secure memory 330 may authenticate user devices before authorizing access to a secret. For example, authentication may be accomplished via supply of a password. In another example, a dynamic value may be used to generate temporary tokens for access. Access may be determined by one or more stored policies.

Cryptography Service

Figure 4:
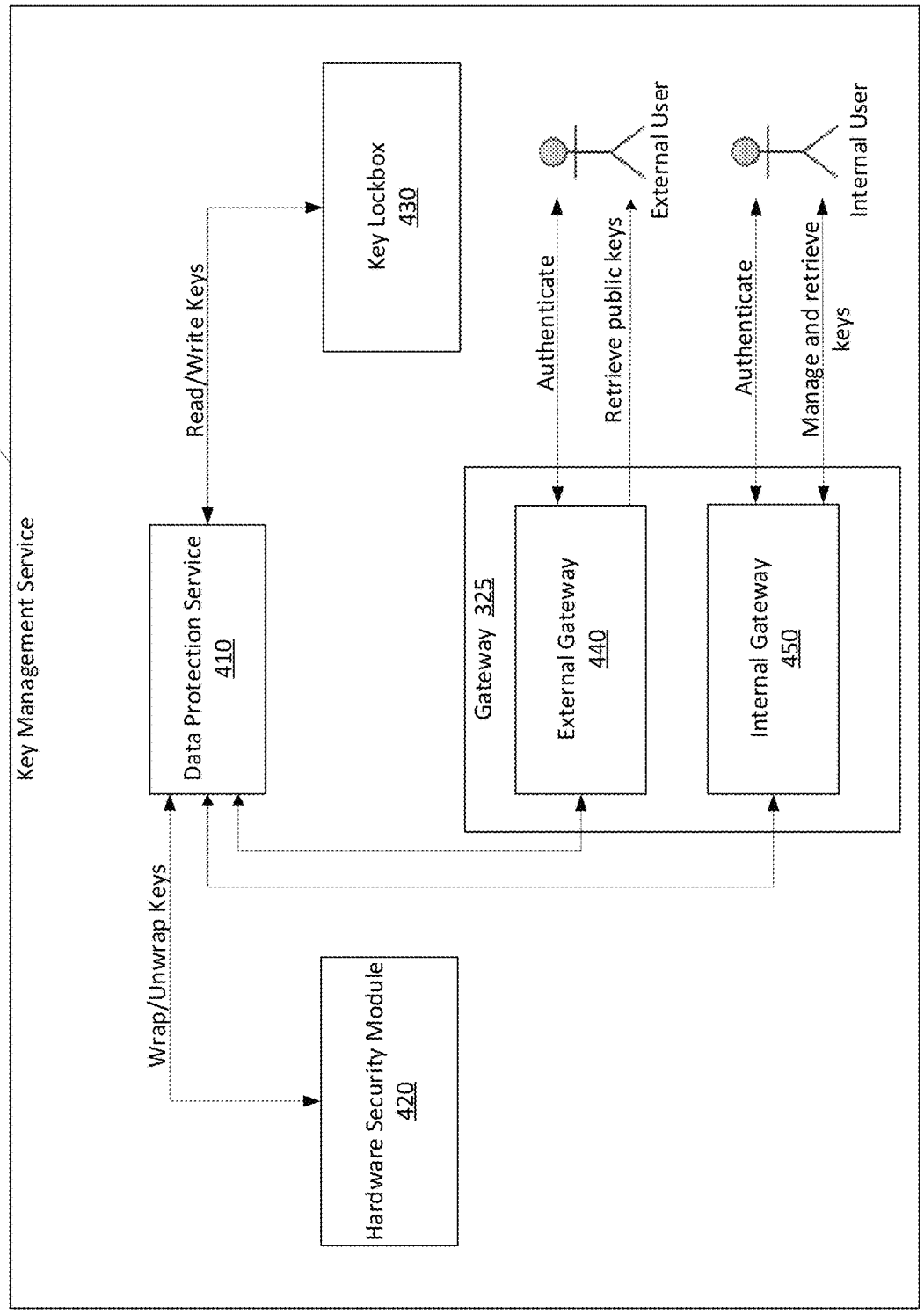
FIG. 4 depicts a key management server (e.g., a key management software-as-a-service executing on a server) that may be used in accordance with one or more illustrative aspects described herein.

In FIG. 4, the key management service 156 is depicted that may include one or more of a data protection server 410, a hardware security module 420, a key lockbox 430, an external gateway 440, and an internal gateway 450.

The data protection server 410 may be configured to perform encryption services, including key rotation, storing key metadata, cryptographic operations (e.g., encryption, decryption, signature generation, signature verification, etc.), and the like. In some examples, the data protection server 410 comprises a software-as-a-service (SaaS) that is executed on the data protection server 410. The SaaS may be configured to perform encryption services, including key rotation, storing key metadata, cryptographic operations, and the like. As will be discussed in greater detail below with respect to FIG. 5, data protection server 410 may include key rotation module 510, key metadata storage 520, a cryptography-as-a-service application programming interface (API) 530, and/or a cryptographic key management API 540.

The hardware security module 420 may comprise a physical computing device configured to store one or more cryptographic keys. The hardware security module 420 may be a plug-in card that connects to a computing device. Alternatively, the hardware security module 420 may be an external device that attaches directly to the computing device. The hardware security module 420 may comprise one or more crypto processor chips. The hardware security module 420 may also be configured to store a master key encrypting key (KEK). A master KEK may be used to encrypt other keys. In some implementations, a master KEK is stored securely in a hardware security module 420 so as to not lose access to all data encrypted using keys that have been encrypted by the master KEK. In some implementations, other cryptographic keys and secrets as described herein may be stored in the hardware security module as well.

The key lockbox 430 may be configured, in some implementations, as a software program to securely store cryptographic secrets, such as cryptographic keys. The cryptographic keys may comprise master KEKs, as well as other cryptographic keys such as public/private key pairs, symmetric keys, and the like. The key lockbox 430 may be configured to utilize one or more of a hardware security module (e.g., hardware security module 420) or secure memory (e.g., secure memory 330) to store the cryptographic secrets.

The external gateway 440 may be configured to interface with external user devices. In some implementations, the external gateway 440 is configured to allow access to APIs and/or other functionality associated with at least some cryptographic services. External user devices may have access to fewer services than internal users.

The internal gateway 450 may be configured to interface with internal devices and/or applications. For example, the internal gateway 450 may be configured to interface with internal devices and/or applications of an organization. The internal devices and/or applications may communicate via a secure network. In some implementations, the internal gateway 450 may be configured to allow access to APIs and/or other functionality associated with key management and cryptographic services. Internal devices and/or applications may have more access to more than external devices. For example, internal devices and/or applications may have access to symmetric key cryptography as the communications and other data payloads stay internal to the organization.

Figure 5:
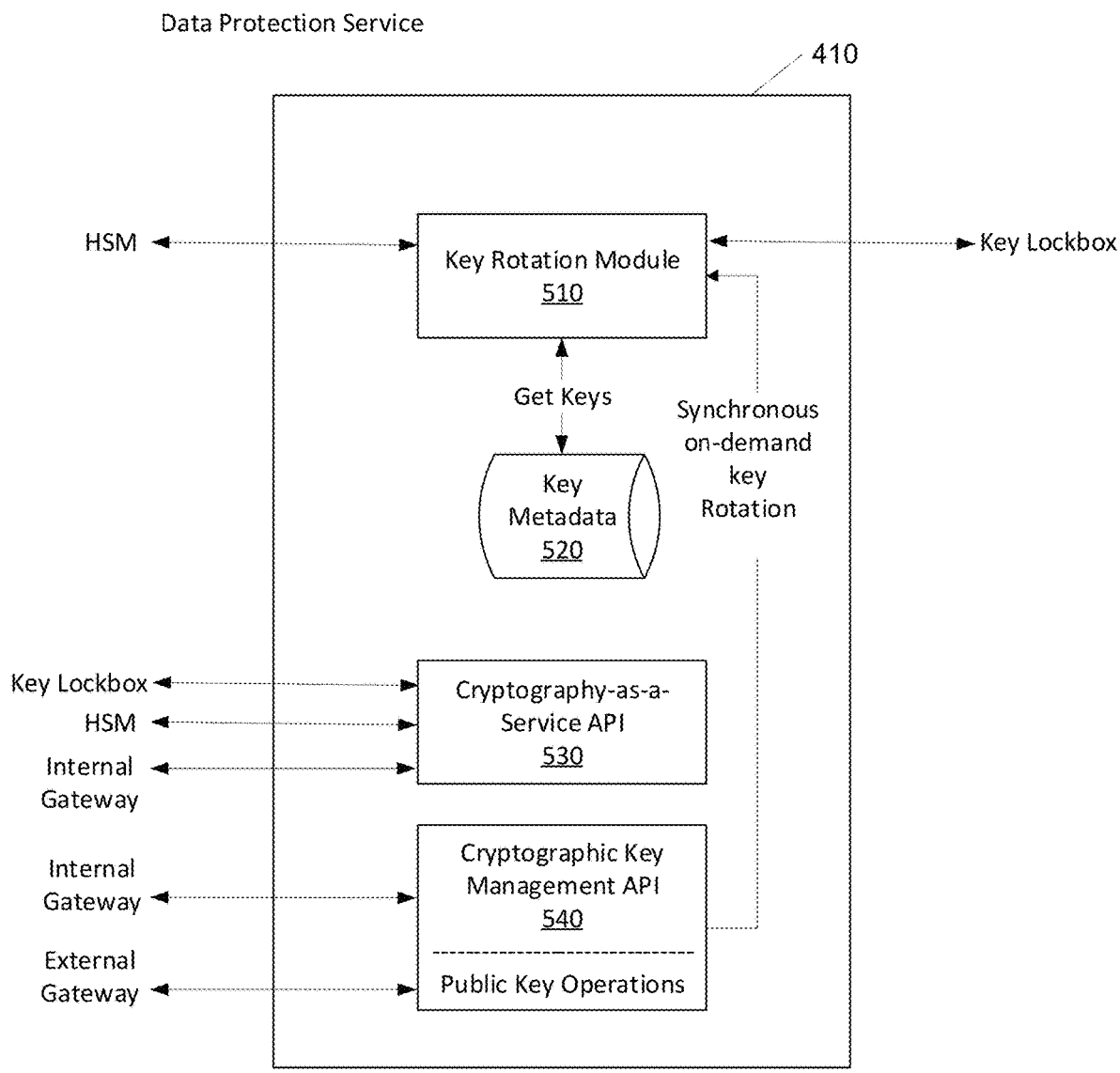
FIG. 5 depicts an expanded view of the data protection service that is part of the key management server that may be used in accordance with one or more illustrative aspects described herein.

In FIG. 5, the data protection server 410 is further depicted in more detail and may include key rotation module 510, key metadata storage 520, a cryptography-as-a-service API 530, and cryptographic key management API 540.

The key rotation module 510 may be configured to control key rotation. For example, a managed key may not be subject to automated scheduled rotation if conditions are met. Conditions may be based on key attributes such as "key ID," "key type," "use," "key operations," "algorithm," and the like. In some implementations, a key ID attribute may be an identification parameter that allows a match to a specific key. In some implementations, a key type attribute may identify the cryptographic algorithm family used with the key. In some implementations, a use attribute may identify the intended use of a public key. For example, use may include encryption or verification. In some implementations, a key operations attribute may be a parameter that identifies one or more operations for which the key is intended to be used. For example, operations may include sign, verify, encrypt, decrypt, and the like. In some implementations, an algorithm attribute may identify an encryption algorithm to be used with the key. Key rotation module 510 may be configured to rotate a managed key instance. For example, a managed key may be rotated on demand and a user requests that existing valid key instances be invalidated following the generation of the new key instance. In another example, a managed key may be rotated on a schedule.

The key rotation module 510 may further be configured to implement a key rotation policy. The key rotation module 510 may be configured to implement a rotation policy of a managed key specification that specifies a validity period and/or rotation interval. For example, a validity period may specify the duration of time for which the key will be valid from the moment of generation which provides an expiration date. A rotation interval may specify the duration of time after a rotation is completed before the next rotation is performed. Key rotation module 510 may be configured to implement rotational intervals that are generally shorter than the validity period.

The key rotation module 510 may be further configured to set a daily rotation window as part of a rotation policy, in some implementations. This may ensure that rotations are performed during a particular part of the day, such as off-peak or after hours. In some implementations, keys that would become due for rotation between two rotation windows are rotated ahead of schedule by key rotation module 510 and/or during the last rotation window during which they would otherwise be valid. In some implementations, where no rotation window is set, keys may be rotated at any time.

The key rotation module 510 may be further configured to set a restricted window as part of a rotation policy, in some implementations. A restricted window may be a specified timeframe during which no operations may be performed. Restricted windows may comprise a start time and an end time. In some implementations, key rotation module 510 may apply a restricted window to specified key sets or specified managed keys. A restricted window may be in one of the following states of: planned, active, completed, or canceled. In some implementations, while a restriction window is in effect, no scheduled rotations are performed by key rotation 510 for the restricted group, no on demand rotations may be requested for the restricted group, and/or no new managed keys may be created if the restricted group is global. In some implementations if any managed key within the restricted group would become due for rotation during the restricted window, it is immediately rotated at the start of the restricted window by key rotation module 510. In some implementations, the validity period and/or rotation interval of rotated keys is set such that they will not expire before the restriction window ends.

The key metadata storage 520 may be configured to store metadata related to cryptographic keys. Metadata related to cryptographic keys may include one or more of a name, description, key type, key purpose, key creation date, a key activation date, a key last change date, a key revocation date, a key compromise, a key material destruction date, key revocation reasons, exportability, rotational interval, key check value, core key attributes, trusted key status, key group membership, and/or the like.

The cryptography-as-a-service API 530 may be configured to grant access to functionality, such as encryption and decryption, digital signing of data, and the like, to internal users and/or external users. In some implementations, access to the cryptography-as-a-service API 530 may be granted to an external user if being accessed through an external gateway, such as external gateway 440. For example, access may be granted for a limited period of time. In another example a time-based crypto-period may be associated with a user such that the time-based crypto-period allows the user access to functions such as encryption or digital signing during certain windows of time. In some implementations, access may be session based, such that the functions are available during a session, resulting in a session-based crypto-period. Sessions may be authorized to allow a subset of cryptographic operations or access to all available cryptographic operations of the cryptography-as-a-service API 530.

In some implementations, the cryptography-as-a-service API 530 may be configured to grant access, with fewer or no limitations, to internal users to functionality, such as encryption and decryption, digital signing of data, and the like. In some implementations, the cryptography-as-a-service API 530 may be configured to grant access to functions or expanded access to functions to an internal user not provided to an external user. A cryptography-as-a-service API 530 may grant access to functionality, such as encryption and decryption, digital signing of data, and the like. For example, access may be granted for longer periods of time to an internal user. In another example a time-based crypto-period may be associated with a user such that the time-based crypto-period allows the user access to functions such as encryption or digital signing during certain windows of time. In some implementations, access may be session based, such that the functions are available during a session, resulting in a session-based crypto-period. Sessions may be authorized to allow a subset of cryptographic operations or access to all available cryptographic operations of the cryptography-as-a-service API 530.

The cryptographic key management API 540 may be configured to grant access to an authenticated device to a cryptographic key management API. For example, the authenticated device may have to be an authenticated internal user device. A cryptographic key management API 540 may allow settings and/or policies to be changed regarding key management which may affect the cryptography-as-a-service functions. In another example, changing settings and/or policies may also change how the system enforces compliances with various laws, regulations, and/or policies.

Key Set Management Service

Figure 6:
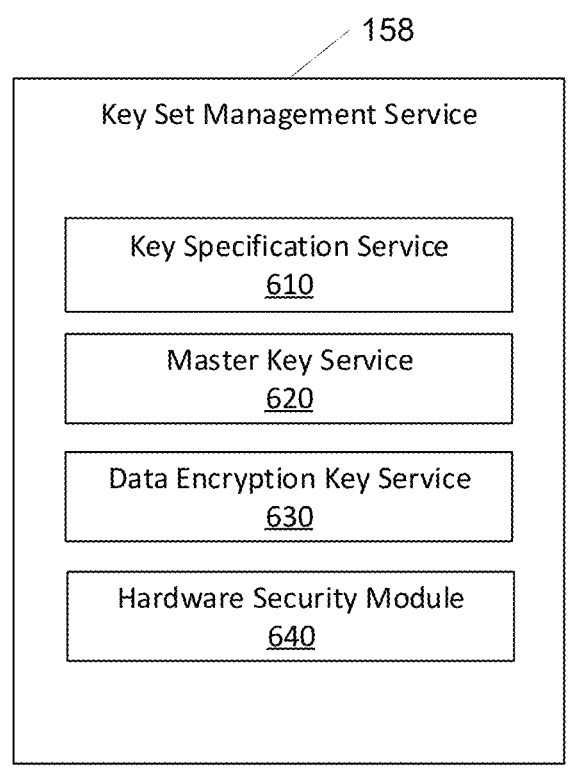
FIG. 6 depicts a key set management service that may be used in accordance with one or more illustrative aspects described herein.

In FIG. 6, the key set management server 158 is depicted that may include a key specification service 610, a master key service 620, and a data encryption key service 630. In some examples, key set management server 158 comprises a SaaS that is executed on the key set management server 158. The SaaS may include key specification service 610, master key service 620, and/or a data encryption key service 630.

The key specification service 610 may be configured to manage key specifications. In some implementations, the key specification service 610 may facilitate the generation, application, and/or management of key specifications. In some implementations, key specification service 610 may be configured to update existing key specifications. The key specification service 610 may be configured to generate and/or store managed key specifications. Managed key specifications may include a set of characteristics from which a cryptographic key may be generated. In some implementations, key specifications may include specifications for security of stored keys, accessibility of stored keys, and the like. Further, the key specification service 610 may be configured to store key specifications and/or attributes associated with the generation of keys, exchange of keys, storage of keys, destruction of keys, and/or replacement of keys. For example, frequency of replacement affects both the security of stored keys, as well as the accessibility of stored keys, and a key specification may determine the frequency of replacement for a certain key when being used for one or more cryptographic services. The key specification service 610 may also be configured to store key specifications segregating keys along a plurality of dimensions. For example, keys may be segregated at the user level where each user utilizes a distinct key, a new managed key is created for each user, and/or the managed keys are in the same key set. In another example, keys may be segregated at the destination level, such that each service that a user might call uses a distinct key, a new managed key is created for each service, and/or the managed keys for each service may be in separate key sets. In some implementations, if the keys are segregated by users, a new managed key is created for each user in a service's key set. In some implementations, a single managed key may be shared by a plurality of users where the single managed key is created with multiple access policies granting access to each respective user. In some implementations, a key set may contain one or more managed keys. A key set may optionally have a unique human-readable label which is attached to unmanaged and/or managed keys. Key sets may be deleted if they no longer contain any valid or active keys. In some implementations, a managed key instance may be a public/private key pair that is generated with a managed key's specified characteristics.

In some implementations, a key specification service 610 may be configured to update key specifications. For example, a key specification service 610 may be configured to receive a request to update a key specification and include the update in a generated one or more managed key specification when authorized and/or applicable. For example, the key specification service 610 may be configured to update a key specification upon receipt of a valid request to update. In some implementations, only authorized users may update a key specification. For example, an authorized user may have to access an API function available only to internal users to update a key specification.

The master key service 620 may be configured to generate and/or store a master key encrypting key (KEK). A master KEK may be used to encrypt other keys. In some implementations, the master key service 620 is configured to store a master KEK securely so as to not lose access to all data encrypted using keys that have been encrypted by the master KEK.

The data encryption key service 630 may be configured to generate data encryption keys (DEKs). In some implementations, a DEK is generated to be used to encrypt data, such as communications or other data payloads. The DEKs may be encrypted by a master KEK. In some implementations, the data encryption key service 630 may be configured to store one or more DEKs in a key set. In some implementations, a key set defines a unique label that is used to retrieve key instances. The unique label may be shared with the user.

Methods and Algorithms Related to the Above Systems and Services

Figure 7:
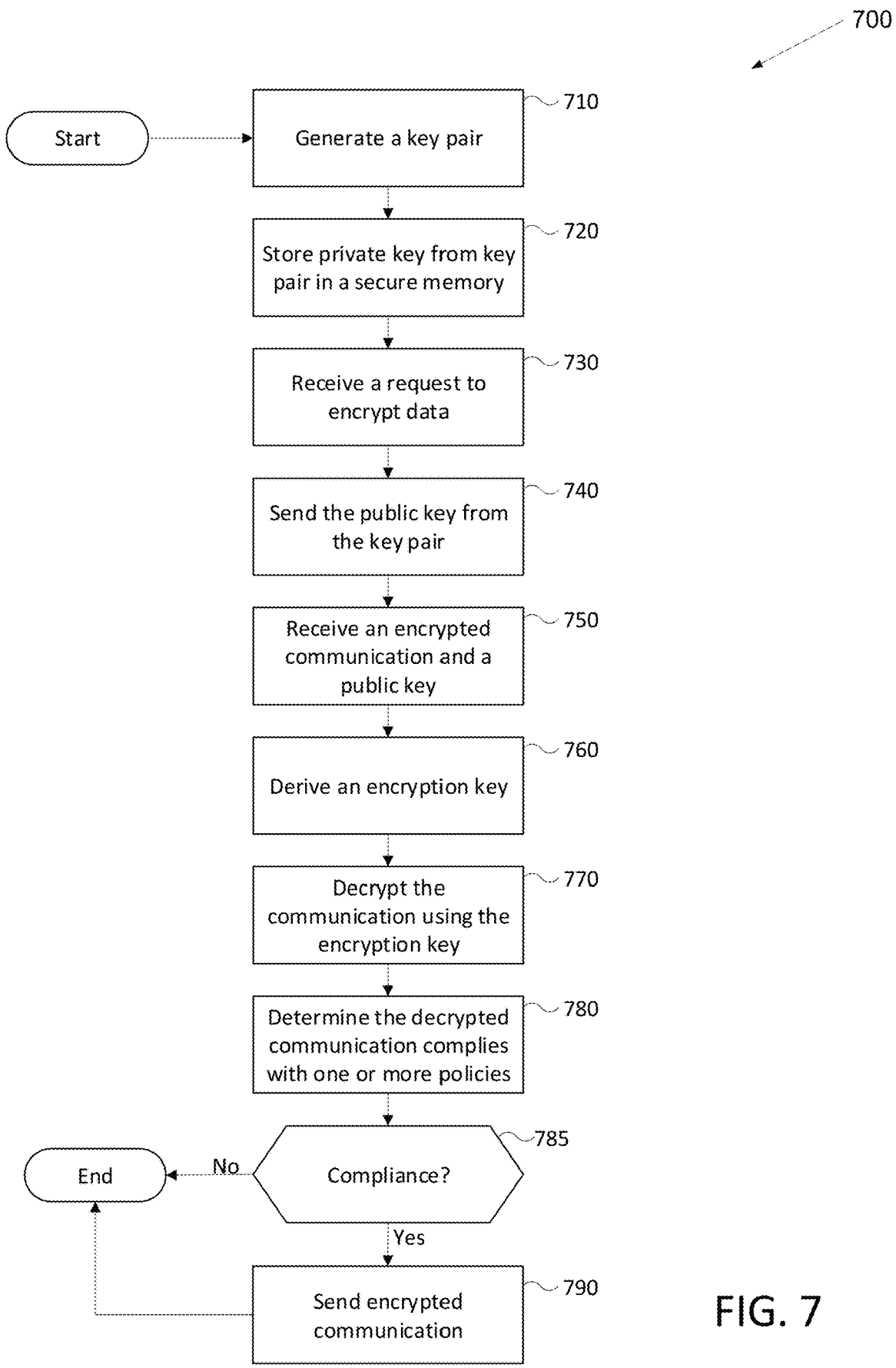
FIG. 7 depicts a flowchart showing an example method for facilitating the sending of a compliant encrypted communication for use in some implementations.

FIG. 7 depicts a process 700 showing an example method or algorithm for sending of an encrypted communication. Process 700 may incorporate a method of securely exchanging cryptographic keys. The method of securely exchanging cryptographic keys may be secure even over a public channel. For example, process 700 may incorporate a Diffie-Hellman exchange. Sending the communication may include invoking cryptography-as-a-service twice: first, by the user device to encrypt the communication and then again by an intermediary to decrypt the communication to check compliance with one or more laws, rules, regulations, policies, and/or requirements, all while keeping the keys used for the decryption secure. The method or algorithm as described in process 700 may be used in some implementations as described herein. The method may be implemented or performed, for example, by one or more of the systems as discussed in connection with FIGS. 1 and 2. The method may be implemented or performed, for example, by one or more computing systems 108. In some examples, the method may be implemented or performed by a data governance system 152. In some examples, the method may be implemented or performed by a data governance service 154. In some embodiments, the actions in the flowchart may be performed in a different order and with different, fewer, or additional actions than those illustrated in FIG. 7. Actions may be combined and/or divided into sub-actions in some implementations. In an alternate variation, the transmitted communication or data payload in the method is digitally signed using a key rather than encrypted.

Process 700 begins in step 710, where a computing device (e.g., a computing system 108) may generate a key pair. A key pair may comprise a private and public key pair. The key pair may be generated using RSA, ECC, or any other suitable asymmetric key generation function.

In step 720, the computing device may store the private key from the key pair in a secure memory. For example, the private key may be stored in secure memory 330. A secure memory (e.g., secure memory 330) may comprise memory that has limited access from functions and applications located on a computing system comprising the secure memory. The secure memory may be configured to store private keys, public keys, and/or public/private key pairs securely. In some examples, the secure memory may be configured to store data such as key pairs in a key set.

In step 730, the computing device may receive a request to encrypt data. For example, the request may be received from a user device (e.g., user device 102). In some implementations, the data may comprise a digital payload to be encrypted by the user device to comply with a rule, regulation, or other compliance requirement. The digital payload may be a communication to be encrypted that needs to comply with state and/or federal law, regulations, and/or an organization's data governance policy. The request may be sent by a user device 102 to a computing system 108. In some examples, the request may include and/or be associated with information relating to one or more of: an identity of the sender, an account identifier associated with the sender, a type of the communication, and the like.

In step 740, the computing device may send the public key from the key pair. For example, the public key may be sent to a user device (e.g., user device 102) responsive to the request. In some implementations, the public key is sent to enable the user device to encrypt a communication or other data payload using the public key from the key pair.

In step 750, the computing device may receive an encrypted communication and a public key. For example, the encrypted communication may be received from the user device and the public key is a second public key generated by the user device. In some implementations, the encrypted communication may have been encrypted by the user device using at least the public key sent in step 740. In some implementations, the encrypted communication may comprise an intended destination (e.g., a destination address) of the communication. In some implementations, the encrypted communication may be accompanied or associated with an intended destination.

In step 760, the computing device may derive an encryption key. For example, the encryption key may be derived using the private key corresponding to the public key sent in step 740 and the second public key generated by the user device in step 750.

In step 770, the computing device may decrypt the communication or other data payload using the encryption key. For example, the encryption key generated in step 760 is used to decrypt the communication.

In step 780, the computing device may determine the decrypted communication or other data payload complies with one or more policies. For example, the communication or data payload may have to comply with a legal requirement. In another example, the communication or data payload may have to comply with a regulatory requirement. In a further example, the communication or data payload may have to comply with a policy from a set of policies. The policies may be required internally by a company or other organization or externally. The relevant law, regulation, or policy may depend on the type of or content of the decrypted communication or other data payload. In some implementations, the relevant law, regulation, or policy may be cross-referenced in a database or otherwise determined based on the type of or content of the decrypted communication. In some implementations, metadata may be read from the decrypted communication or payload or accompanying the decrypted communication or payload to determine the relevant law, regulation, or policy. The computing device may be able to determine if the decrypted communication or other payload is compliant because of the ability to decrypt the communication or other payload.

For example, enforcement may include real-time rule and policy enforcement to encrypted communications and other encrypted data. In some implementations, real-time rule and policy enforcement may include audit logging, legal compliance, regulatory compliance, policy compliance, data loss prevention, and the like. The communication or data payload may be analyzed to determine when such enforcement is applicable.

In step 785, the computing device may determine if the decrypted communication or other data payload is in compliance with one or more laws, rules, regulations, policies, and/or requirements. In some implementations, determining whether the decrypted communication or other data payload is in compliance may include analyzing a formatting of the decrypted communication or data payload. In some implementations, determining whether the decrypted communication or other data payload is in compliance may include analyzing the contents of the decrypted communication or data payload. For example, compliance with a law, rule, regulation, or policy may require audit logging of at least a portion of the contents of an encrypted communication or data payload.

If the decrypted communication is not in compliance (785:NO), then the process 700 may end. In some implementations, process 700 may also return a policy decision upon ending. However, if the decrypted communication is in compliance with one or more laws, rules, regulations, policies, and/or requirements (785:YES), the computing device may send the encrypted communication or data payload in step 790. For example, the encrypted communication may be forwarded to an intended destination. In some implementations, the intended address may be a network or internet address. In some implementations, the intended address may have accompanied or otherwise been associated with the encrypted communication or data payload.

Figure 8:
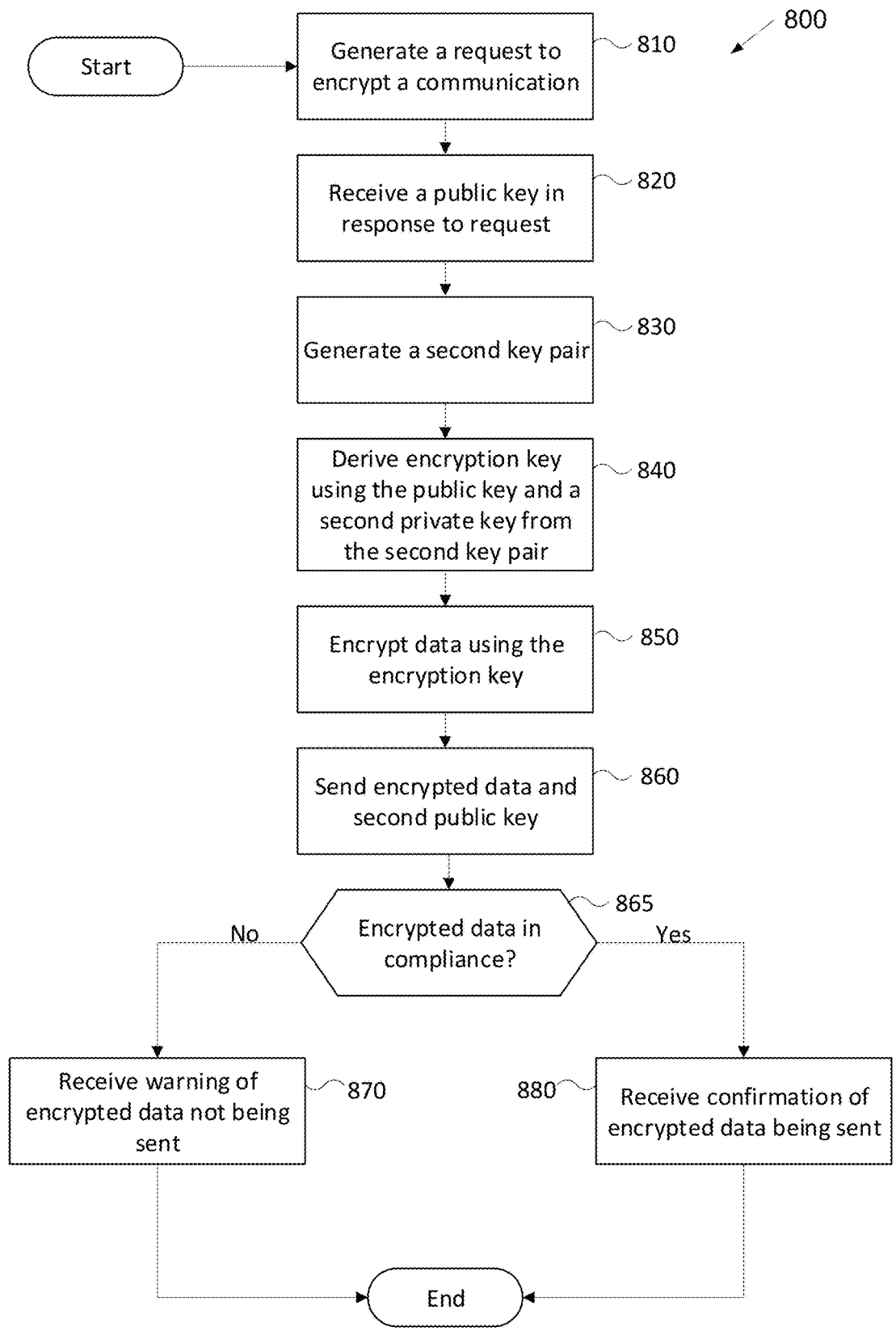
FIG. 8 depicts a flowchart showing an example method for sending an encrypted communication for use in some implementations.

FIG. 8 depicts a process 800 showing an example method or algorithm for sending an encrypted communication or other data payload. Sending the encrypted communication or other data payload may allow for compliance determinations to be made through decryption of the encrypted communication or other data payload while in-transit. The data governance may be handled by an intermediary (e.g., a computing system 108) while keeping the keys used for the decryption secure. Once the intermediary is able to decrypt the encrypted communication or other data payload securely, it may be used to ensure compliance with one or more rules, policies, and/or requirements related to the encrypted communication or data payload. The method or algorithm may be used in some implementations as described herein. The method may be implemented or performed, for example, by one or more of the systems as discussed in connection with FIGS. 1 and 2. The method may be implemented or performed, for example, by one or more of a user device 102. In some examples, the method may be implemented or performed by a data encryption service 140. In some embodiments, the actions in the flowchart may be performed in a different order and with different, fewer, or additional actions than those illustrated in FIG. 8. Actions may be combined and/or divided into sub-actions in some implementations. In an alternate variation, the transmitted communication or data payload in the method is digitally signed using a key rather than encrypted.

Process 800 begins in step 810, where a computing device (e.g., a user device 102) may generate a request to encrypt a communication or other data payload. In some implementations, the request may comprise data or metadata about the communication. For example, the request may be sent to an intermediary such as a computing system (e.g., computing system 108). In some implementations, the communication or other data payload may comprise a digital payload that will be encrypted by the user device to comply with a rule, regulation, or other compliance requirement. The digital payload may be a communication to be encrypted that needs to comply with one or more rules, policies, and/or requirements. The request may be sent by a user device 102 to a computing system 108. In some examples, the request may include and/or be associated with information relating to one or more of: an identity of the sender, an account identifier associated with the sender, a type of the communication, and the like. The request may comprise an intended destination (e.g., a destination address) for a final destination of the communication or data payload.

In step 820, the computing device may receive a public key in response to the request. In some implementations, the public key may have been generated by a computing system (e.g., computing system 108) as part of generating a public/ private key pair. In some examples, the key pair may be generated using RSA, ECC, or any other suitable asymmetric key generation function.

In step 830, the computing device may generate a second key pair. The second key pair may comprise a private and public key pair. The key pair may be generated using RSA, ECC, or any other suitable asymmetric key generation function. In step 840, the computing device may derive an encryption key using the received public key and the private key from the second key pair. This derivation may be accomplished as part of using a Diffie Hellman key exchange or other method of securely exchanging one or more cryptographic keys over a communication channel using the received public key and the private key from the second key pair. In some implementations, the derivation may be accomplished as part of using elliptic curve cryptography to securely exchange the one or more cryptographic keys over the communication channel using the received public key and the private key from the second key pair, wherein the first key pair and the second key pair are an elliptic-curve public/private key pair. In some implementations, the derivation may be accomplished as part of using elliptic curve cryptography and ephemeral keys. The derived encryption key may be used to encrypt a communication or data payload.

In step 850, the computing device may encrypt data using an encryption key. For example, the computing device may encrypt a communication or other data payload as associated with the request in step 810 and the communication or other data payload is encrypted using the derived encryption key from step 840. In some implementations, the encrypted communication may be encrypted with an intended destination (e.g., a destination address) of the communication. In some implementations, the encrypted communication may be accompanied or associated with an intended destination.

In step 860, the computing device may send the encrypted data and the second public key. In some implementations the computing device may send the encrypted data and the public key to a computing system (e.g., computing system 108). In some implementations, the encrypted data may be an encrypted communication and may comprise an intended destination (e.g., a destination address) of the communication. In some implementations, the encrypted communication may be accompanied or associated with an intended destination.

In step 865, the computing device may determine if the encrypted data is in compliance with one or more rules, policies, and/or requirements. In some implementations, the determination is done by the intermediary computing system (e.g., computing system 108) that has been sent the encrypted data. The intermediary computing system may derive the encryption key. The encryption key may be derived based on a private key it already possesses and the second public key that it received with the encrypted communication. The intermediary computing system may use the encryption key to decrypt the encrypted data in order to determine whether the decrypted data complies with one or more policies.

If the encrypted data is not in compliance (865:NO), the computing device may receive a warning associated with the encrypted data in step 870. For example, the computing device may receive a warning communication from a computing system (e.g., computing system 108) that has been sent the encrypted data. In some implementations, the warning may be a message indicating that the contents or formatting of the encrypted data is not in compliance with the relevant law, regulation, or policy. In some implementations, the warning may also include further details on how the encrypted data is not in compliance. In some implementations, the encrypted data may not be sent to a destination associated with the encrypted data and/or otherwise be blocked or prevented from reaching the destination. In some implementations, the encrypted data may be stored at least temporarily for analysis. For example, the data may be stored in a quarantined area of memory for analysis or to provide an opportunity for future analysis.

However, if the encrypted data is in compliance with one or more rules, policies, and/or requirements (855:YES), the computing device may receive a confirmation associated with the encrypted data in step 880. For example, the computing device may receive a confirmation that the encrypted data was forwarded to an intended destination due to being in compliance with the one or more rules, policies, and/or requirements.

Figure 9:
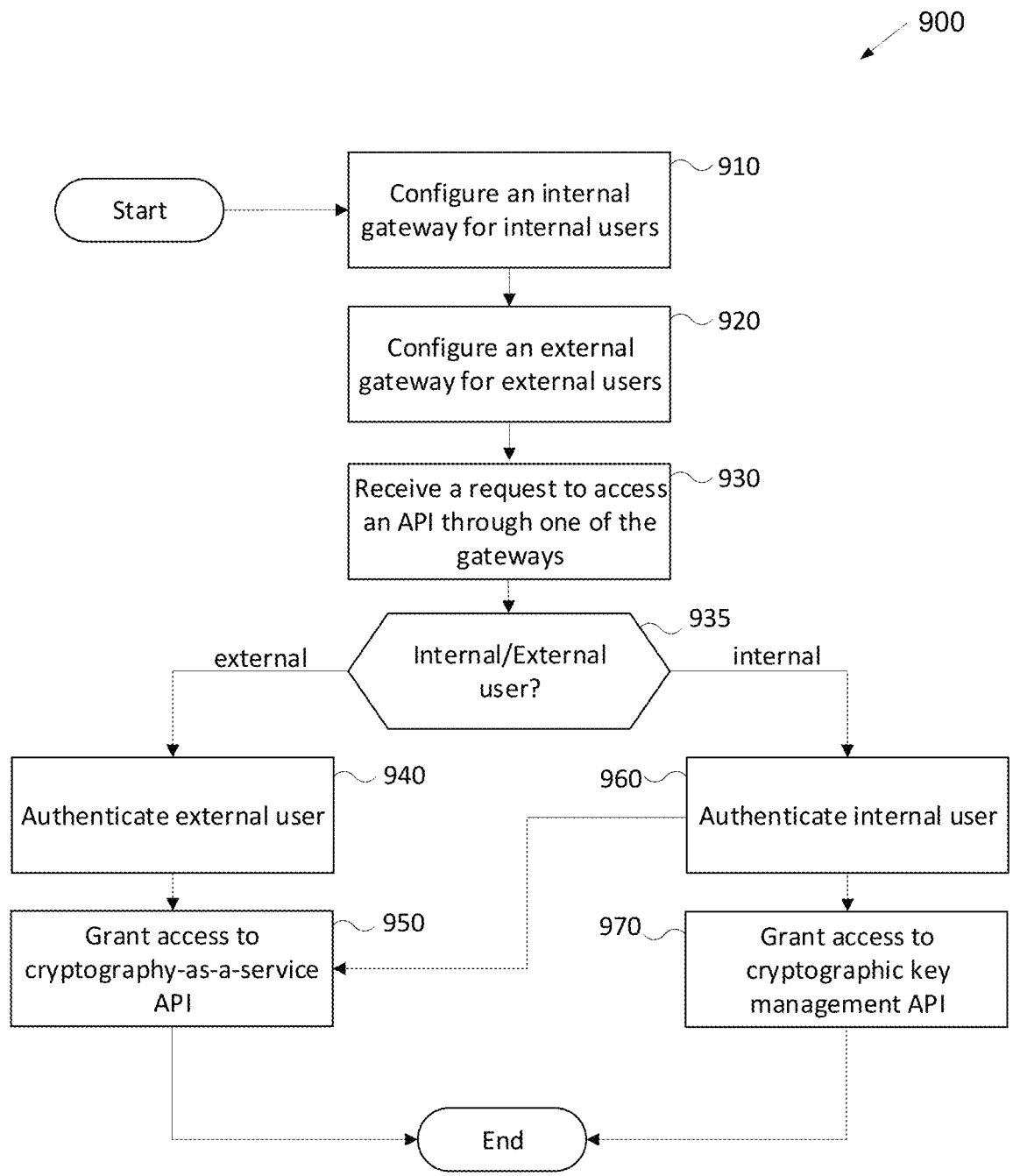
FIG. 9 depicts a flowchart for configuring access for use in some implementations.

FIG. 9 depicts a process 900 showing an example method or algorithm for configuring access to services. Access to services may include access to one or more different APIs. Access may depend on if a user is authenticated as an external user or an internal user. The method or algorithm may be used in some implementations as described herein. The method may be implemented or performed, for example, by one or more of the systems as discussed in connection with FIGS. 1 and 2. The method may be implemented or performed, for example, by one or more of a computing system 108. In some examples, the method may be implemented or performed, for example, by a data governance system 152. In some examples, the method may be implemented or performed by a key management service 156. In some embodiments, the actions in the flowchart may be performed in a different order and with different, fewer, or additional actions than those illustrated in FIG. 9. Actions may be combined and/or divided into sub-actions in some implementations.

Process 900 begins in step 910, where a computing device (e.g., a computing system 108) may configure an internal gateway for internal users. In some implementations, the internal gateway is configured to allow access to APIs and/or other functionality associated with key management and cryptographic services. Internal users may have more access than external users for various services available as cryptography-as-a-service as well as cryptographic key management associated with those various services. Cryptographic services may include encryption and decryption, digital signing of data, and the like. Internal users may have access to symmetric key cryptography as the communications and other data payloads may stay internal to the organization.

In step 920, the computing device may configure an external gateway for external users. In some implementations, the external gateway is configured to allow access to APIs and/or other functionality associated with at least some cryptographic services. External users may not have as much access as internal users. In step 930, the computing device may receive a request to access an API through one of the gateways. In some implementations, the request may be for a cryptographic service.

In step 935, the computing device may determine if the request is from an internal user or an external user. In some implementations, the request includes one or more identifiers identifying the requestor as an internal or external user. In some implementations, the determination may further be accomplished by determining an origin of the request. For example, the request may come from an internal network connection which identifies the requestor as an internal user.

If the request is from an external user (935:EXTERNAL), the computing device may authenticate the external user in step 940. In some implementations, authentication of the external user may comprise the external user logging in with identifying information, such an account number or username and a password, exchanging identifying information in a data handshake protocol, two or multi-factor authentication, and the like. Identifying information may be checked against one or more databases with stored identification information. The database may include, but are not limited to relational databases, hierarchical databases, distributed databases, in-memory databases, flat file databases, XML databases, NoSQL databases, graph databases, and/or a combination thereof.

In step 950, an authenticated external user may be granted access to a cryptography-as-a-service API. In some implementations, being authenticated as an external user prevents access to other functions or APIs. A cryptography-as-a-service API may grant access to functionality, such as encryption and decryption, digital signing of data, and the like. As a further example, an external user may not be granted access to a cryptographic key management API. In some implementations, access may be granted to a cryptography-as-a-service API with limitations. For example, access may be granted for a limited period of time. In another example a time-based crypto-period may be associated with a user such that the time-based crypto-period allows the user access to functions, such as encryption or digital signing during certain windows of time. In some implementations, access may be session based, such that the functions are available during a session, resulting in a session-based crypto-period. Sessions may be authorized to allow a subset of cryptographic operations or access to all available cryptographic operations of the cryptography-as-a-service API.

If the request is from an internal user (935:INTERNAL), the computing device may authenticate the internal user in step 960. In some implementations, authentication of the internal user comprises logging in, by the internal user, with identifying information, such an account number or username and a password, exchanging identifying information in a data handshake protocol, two or multi-factor authentication, and the like. Identifying information may be checked against one or more databases with stored identification information. The database may include, but are not limited to relational databases, hierarchical databases, distributed databases, in-memory databases, flat file databases, XML databases, NoSQL databases, graph databases, and/or a combination thereof.

In step 970, an authenticated internal user may be granted access to a cryptographic key management API. In some implementations, an internal user is given access to other functions and APIs such as a cryptography-as-a-service API. A cryptography-as-a-service API may grant access to functionality, such as encryption and decryption, digital signing of data, and the like. As a further example, an internal user may also be given access to a cryptographic key management API. A cryptographic key management API may allow settings and/or policies to be changed regarding key management which may affect the cryptography-as-a-service functions. In another example, changing settings and/or policies may also change how the system enforces compliances with various laws, regulations, and policies.

In step 950, an authenticated internal user may be granted access to a cryptography-as-a-service API. In some implementations, being authenticated as an internal user provides access to functions or expanded access to functions not provided to an external user. A cryptography-as-a-service API may grant access to functionality such as encryption and decryption, digital signing of data, and the like. In some implementations, access may be granted to a cryptography-as-a-service API with no limitations, or fewer limitations than that granted to an external user. For example, access may be granted for longer periods of time. In another example a time-based crypto-period may be associated with a user such that the time-based crypto-period allows the user access to functions, such as encryption or digital signing during certain windows of time. In some implementations, access may be session based, such that the functions are available during a session, resulting in a session-based crypto-period. Sessions may be authorized to allow a subset of cryptographic operations or access to all available cryptographic operations of the cryptography-as-a-service API.

Figure 10:
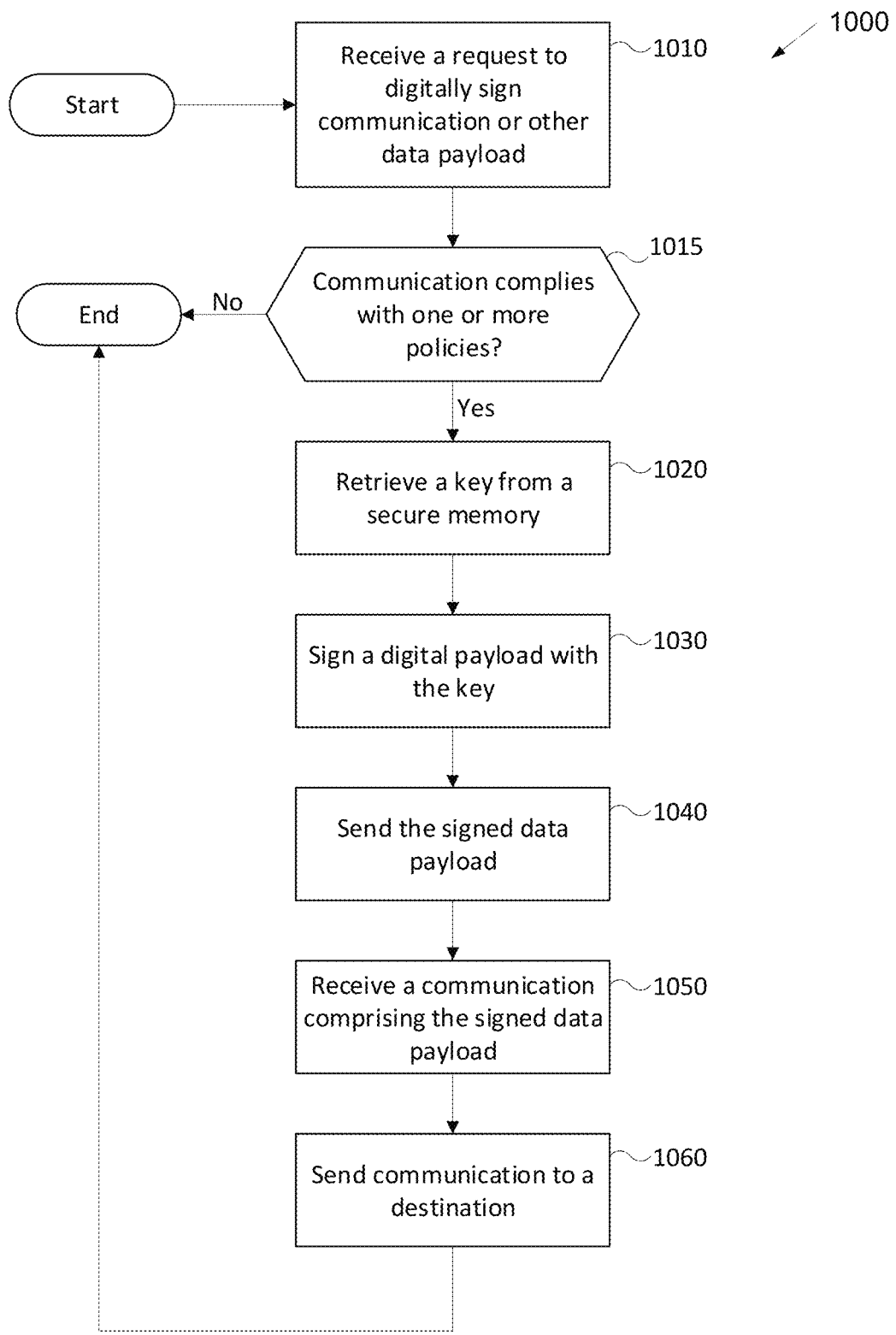
FIG. 10 depicts a flowchart for digitally signing data for use in some implementations.

FIG. 10 depicts a process 1000 showing an example method or algorithm for digitally signing data. The verification of the data, such as a digitally signed communication or other data, for compliance may allow for the digital signing of the communication, or other data, by an intermediary (e.g., a computing system 108) using a key. In other words, once the intermediary is able to evaluate compliance of the communication or other data, the intermediary may be used to digitally sign the communication or other data. Compliance may be evaluated with regards to one or more rules, policies, and/or requirements related to the communication or other data payload that is to be digitally signed. The method or algorithm may be used in some implementations as described herein. The method may be implemented or performed, for example, by one or more of the systems as discussed in connection with FIGS. 1 and 2. The method may be implemented or performed, for example, by one or more of a computing system 108. In some examples, the method may be implemented or performed, for example, by a data governance system 152. In some examples, the method may be implemented or performed by a key management service 156. In some embodiments, the actions in the flowchart may be performed in a different order and with different, fewer, or additional actions than those illustrated in FIG. 10. Actions may be combined and/or divided into sub-actions in some implementations.

Process 1000 begins in step 1010, where a computing device (e.g., a computing system 108) may receive a request to digitally sign data. In some implementations, the data may comprise a digital payload to be signed. The digital payload may be signed to validate the authenticity and/or integrity of the data payload once it has been received at a destination. The digital payload may be signed to provide evidence of origin, identity, and/or status of the entity signing the digital payload. In some implementations, the digital signature may be used to transmit the data payload for entry into a distributed ledger. The distributed ledger may be based on blockchain technology.

In step 1015, the computing device may determine if the communication is in compliance with one or more laws, rules, regulations, policies, and/or requirements. In some implementations, determining whether the decrypted communication or other data payload is in compliance with one or more laws, rules, regulations, policies, and/or requirements may include analyzing a formatting of the authenticated communication or data payload. In some implementations, determining whether the authenticated communication or other data payload is in compliance with one or more laws, rules, regulations, policies, and/or requirements may include analyzing the contents of the authenticated communication or data payload. If the decrypted communication is not in compliance (1015:NO), then the process 1000 may end. However, if communication is in compliance (1065:YES), the computing device may proceed to step 1020.

In step 1020, the computing device may retrieve a key from a secure memory. A secure memory (e.g., secure memory 330) may comprise memory that has limited access from functions and applications located on a computing system comprising the secure memory. The secure memory may be configured to store private keys, public keys, and/or public/private key pairs securely. In some implementations, the retrieved key is associated with the requestor. For example, the retrieved key may be associated with an account number or other identifier.

In step 1030, the computing device may sign the digital payload with the key (e.g., a private key). In some implementations, the key may be used to digitally sign the digital payload formatted in a manner appropriate to the respective application the digital payload is needed for. For example, the digital payload may be digitally signed in a format to be transmitted or broadcast to a distributed network. The key may be used to sign a cryptocurrency transaction using data included in transaction data. In another example, the key may be used to digitally sign data in a way that complies with a smart contract stored in blockchain and distributed ledger technology environments. In another example, the key may be used to digitally sign a data payload to enable entity authentication. In some implementations, the digital signature encapsulates an indication of a positive decision that the communication is in compliance with one or more laws, rules, regulations, policies, and/or requirements.

In step 1040, the computing device may send the signed data payload. In some implementations, the signed data payload is sent back to the requestor that requested the digitally signed data. For example, the requestor may be a user device 102, and the request is sent through a cryptography-as-a-service API (e.g., cryptography-as-a-service API 530). In step 1050, the computing device may receive a communication comprising the signed data payload. In some implementations, the communication is received back from the user device (e.g., user device 102). In some implementations, the signed data payload is not sent back to the requestor but is instead sent on to a final destination. For example, the data payload may be a communication accompanying a request to have the communication signed with a digital signature and a destination and the communication is forwarded to the destination after being signed by the software service.

In step 1060, the computing device may send the digitally signed communication or data payload to a destination. For example, the encrypted communication may be forwarded to an intended destination. In some implementations, the intended address may be an internet address. In some implementations, the intended address may have accompanied or otherwise been associated with the encrypted communication or data payload. In some implementations, the encrypted communication is only forwarded to the intended destination upon a determination that the digital signature encapsulates an indication of a positive decision that the communication is in compliance with one or more laws, rules, regulations, policies, and/or requirements.

Methods and Algorithms Related to a Key Management Service

Figure 11:
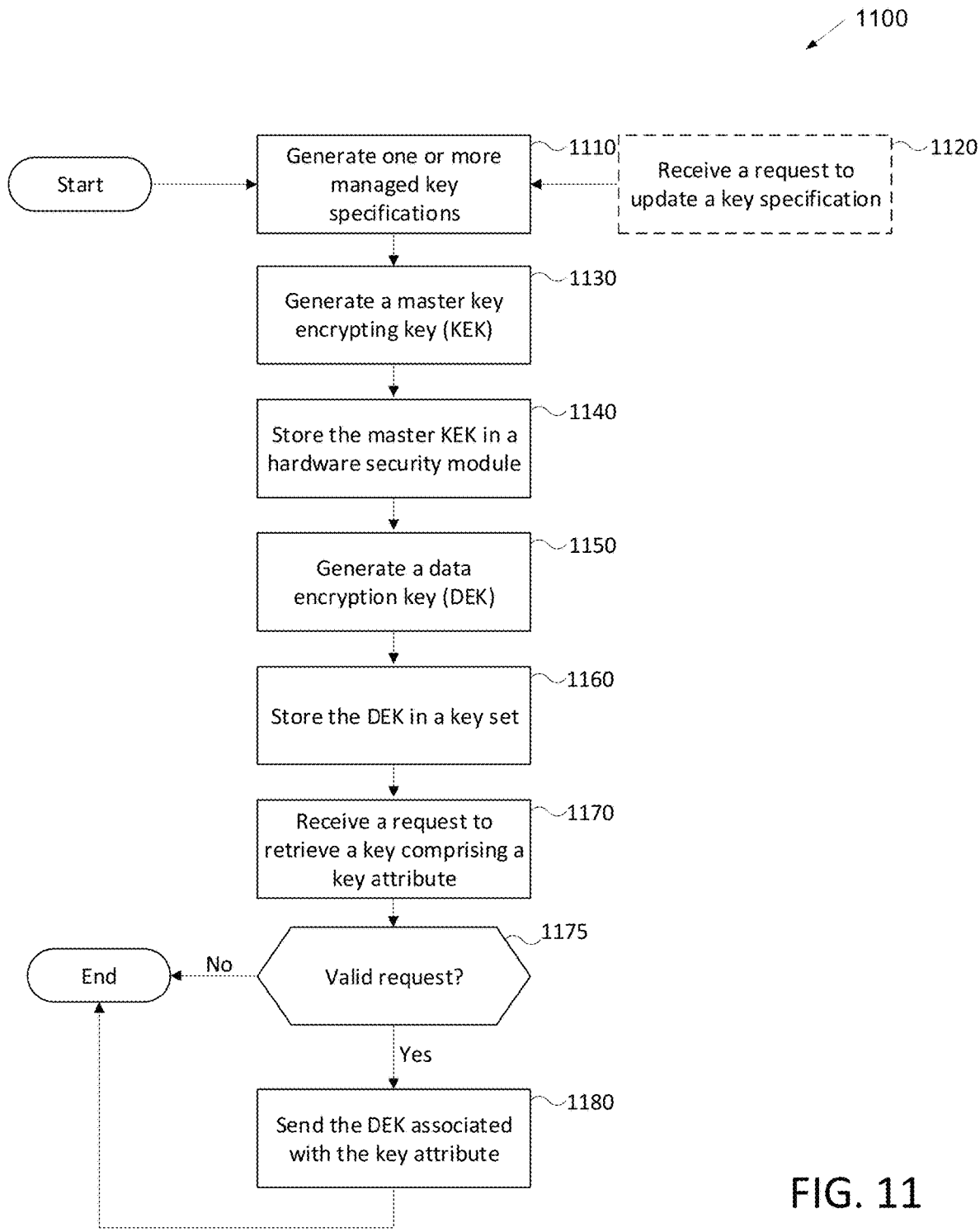
FIG. 11 depicts a flowchart for managing key specifications for use in some implementations.

FIG. 11 depicts a process 1100 showing an example method or algorithm for managing key specifications. The method or algorithm may facilitate the generation, application, and/or management of key specifications. Management of key specifications may include updating key specifications. The method or algorithm may be used in some implementations as described herein. The method may be implemented or performed, for example, by one or more of the systems as discussed in connection with FIGS. 1 and 2. The method may be implemented or performed, for example, by one or more of a computing system 108. In some examples, the method may be implemented or performed, for example, by a data governance system 152. In some examples, the method may be implemented or performed by a key set management service 158. In some embodiments, the actions in the flowchart may be performed in a different order and with different, fewer, or additional actions than those illustrated in FIG. 11. Actions may be combined and/or divided into sub-actions in some implementations.

Process 1100 begins in step 1110, where a computing device (e.g., a computing system 108) may generate one or more managed key specifications. Managed key specifications may include a set of characteristics from which a cryptographic key may be generated. In some implementations, key specifications may include specifications for security of stored keys, accessibility of stored keys, and the like. Further, management of keys may include key specifications and/or attributes associated with generation of keys, exchange of keys, storage of keys, destruction of keys, and/or replacement of keys. For example, frequency of replacement affects both the security of stored keys as well as the accessibility of stored keys and a key specification may determine the frequency of replacement for a certain key when being used for one or more cryptographic services. Key specifications may also include segregation of keys along several dimensions. For example, keys may be segregated at the user level where each user utilizes a distinct key, a new managed key is created for each user, and/or the managed keys are in the same key set. In another example, keys may be segregated at the destination level, such that each service that a user might call uses a distinct key, a new managed key is created for each service, and/or the managed keys for each service are in separate key sets. In some implementations, if the keys are segregated by users, a new managed key is created for each user in a service's key set. In some implementations, a single managed key may be shared by a plurality of users where the single managed key is created with multiple access policies granting access to each respective user. In some implementations, a key set may contain one or more managed keys. A key set may optionally have a unique human-readable label which is attached to unmanaged and/or managed keys. Key sets may be deleted if they no longer contain any valid or active keys. In some implementations, a managed key instance may be a public/private key pair that is generated with a managed key's specified characteristics.

In some implementations, managed key specifications may control key rotation. For example, a managed key may not be subject to automated scheduled rotation if conditions are met. Conditions may be based on key attributes such as "key ID," "key type," "use," "key operations," "algorithm," and the like. In some implementations, a key ID attribute may be an identification parameter that allows a match to a specific key. In some implementations, a key type attribute may identify the cryptographic algorithm family used with the key. In some implementations, a use attribute may identify the intended use of a public key. For example, use may include encryption or verification. In some implementations, a key operations attribute may be a parameter that identifies one or more operations for which the key is intended to be used. For example, operations may include sign, verify, encrypt, decrypt, and the like. In some implementations, an algorithm attribute may identify an encryption algorithm to be used with the key. A managed key instance may be rotated. For example, a managed key may be rotated on demand and a user requests that existing valid key instances be invalidated following the generation of the new key instance. In another example, a managed key may be rotated on a schedule.

In some implementations, as part of a rotation policy, a managed key specification specifies a validity period and rotation interval. For example, a validity period may specify the duration of time for which the key will be valid from the moment of generation which provides an expiration date. A rotation interval may specify the duration of time after a rotation is completed before the next rotation is performed. Thus, rotational intervals are generally shorter than the validity period.

In some implementations, as part of a rotation policy, a daily rotation window may be set. This may ensure that rotations are performed during a particular part of the day, such as off-peak or after hours. In some implementations, keys that would become due for rotation between two rotation windows are rotated ahead of schedule and/or during the last rotation window during which they would otherwise be valid. In some implementations, where no rotation window is set, keys may be rotated at any time of day.

In some implementations, as part of a rotation policy, a restricted window may be set. In some implementations, a restricted window is a specified timeframe during which no operations may be performed. Restricted windows may comprise a start time and an end time. In some implementations, one or more restricted windows may be applied to specified key sets or specified managed keys. A restricted window may be in one of the following states of: planned, active, completed, or canceled. In some implementations, while a restriction window is in effect, no scheduled rotations are performed for the restricted group, no on demand rotations may be requested for the restricted group, and/or no new managed keys may be created if the restricted group is global. In some implementations if any managed key within the restricted group would become due for rotation during the restricted window, it is immediately rotated at the start of the restricted window. In some implementations, the validity period and/or rotation interval of rotated keys is set such that they will not expire before the restriction window ends.

In step 1120, the computing device may receive a request to update a key specification. An update to a key specification, including an update to a generated one or more managed key specifications, may be done when applicable. For example, an update to a generated one or more managed key specification(s) may be done when a valid request to update a respective key specification is received or pending. In some implementations, only authorized users may update a key specification. For example, an authorized user may have to access an API function available only to internal users to update a key specification.

In step 1130, the computing device may generate a master key encrypting key (KEK). A master KEK may be used to encrypt other keys. In some implementations, a master KEK is stored securely so as to not lose access to all data encrypted using keys that have been encrypted by the master KEK. In some implementations, an already existing master KEK is retrieved.

In step 1140, the computing device may store the master KEK securely. In some implementations, the master KEK is stored in a hardware security module (HSM). For example, the master KEK may be stored in HSM 640. In some implementations, the KEK may be stored in a secure memory. A secure memory may comprise memory that has limited access from functions and applications located on a computing system comprising the secure memory. The secure memory may be configured to store private keys, public keys, and/or public/private key pairs securely.

In step 1150, the computing device may generate a data encryption key (DEK). In some implementations, a DEK is generated to be used to encrypt data such as communications or other data payloads. The DEK may be encrypted by the master KEK. In step 1160, the generated DEK may be stored in a key set. In some implementations, a key set defines a unique label that is used to retrieve key instances. The unique label may be shared with the user.

In step 1170, the computing device may receive a request to retrieve a key comprising a key attribute. In some implementations, key attributes include "key ID," "key type," "use," "key operations," "algorithm," and the like. In some implementations, a key ID attribute may be an identification parameter that allows a match to a specific key. For example, use of the key ID attribute may allow for the selection of a key from a set of keys during a key rollover. In some implementations, a key type attribute may identify the cryptographic algorithm family used with the key. For example, the key type may be "RSA." In some implementations, a use attribute may identify the intended use of a public key. For example, the "use" key attribute may identify a key as for use in encrypting data, signing data, verifying a signature, etc. In some implementations, a "key operations" key attribute may be a parameter that identifies one or more operations for which the key is intended to be used. For example, use of the key for signing, verifying, encrypting, decrypting, etc. In some implementations, an algorithm attribute may identify an algorithm intended for use with the key.

In step 1175, the computing device may determine if the request to retrieve a key comprising a key attribute is valid. In some implementations, a request may be invalid if the request includes a non-existent key attribute. In some implementations, a request may be invalid if the key is expired. In some implementations, a request may not be invalid if the request is not in compliance with one or more managed key specifications. If the request is not valid (1175:NO), the process 1100 may end.

If the request is valid (1175:YES), the computing device may send the DEK associated with the key attribute in step 1180. In some implementations, the DEK is sent to the requestor. In some implementations, supported key types include ECC, RSA, AES, and the like.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like. that perform particular tasks or implement particular abstract data types when executed by a processor in a computer or other device. The modules may be written in a source code programming language that is subsequently compiled for execution, or may be written in a scripting language such as (but not limited to) Python, Perl, or any appropriate scripting language. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is, therefore, to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A computer-implemented method comprising:
receiving, by a computing system and from a first user device, a first request to access a cryptographic key management service;
determining, by the computing system, whether the first request to access the cryptographic key management service was received via an internal gateway or an external gateway, wherein;
the internal gateway is configured to authenticate an internal user, via an internal interface, thereby allowing the internal user to create, use, and retrieve cryptographic key pairs by accessing at least one of a cryptography-as-a-service application programming interface (API) or a cryptographic key management API, and
the external gateway is configured to authenticate an external user, via an external interface, thereby allowing the external user to retrieve public keys by accessing the cryptography-as-a-service API, wherein the external user is prevented from accessing the cryptographic key management API;
providing, based on a determination that the first request was received via the internal gateway, access to the cryptographic key management API;
receiving, from the first user device and by the cryptographic key management API, a second request to update a key management setting for a first key pair;
updating, in a secure memory and based on the second request to update the key management setting, key metadata for the first key pair, wherein the updated key metadata comprises updated key rotation data;
receiving, from a second user device and by the cryptography-as-a-service API, a third request to perform a cryptographic operation associated with the first key pair;
determining whether the cryptographic operation associated with the first key pair is permitted based on the updated key metadata for the first key pair;
retrieving, from the secure memory and based on a determination that the cryptographic operation is permitted, one or more encryption keys corresponding to the first key pair;
performing the cryptographic operation using the retrieved one or more encryption keys corresponding to the first key pair;
determining, based on the third request to perform the cryptographic operation and the updated key metadata for the first key pair, that the one or more encryption keys should be updated;
updating, using a key rotation service, the one or more encryption keys; and
storing the one or more updated encryption keys in the secure memory.

2. The computer-implemented method of claim 1, further comprising:
receiving, by the computing system and from the second user device, a fourth request to access the cryptographic key management service;
denying, based on a determination that the fourth request was received via the external gateway, access to the cryptographic key management API.

3. The computer-implemented method of claim 1, further comprising:
receiving, by the computing system and from the second user device, a fourth request to access the cryptography-as-a-service API; and
providing, based on a determination that the fourth request was received via the external gateway, access to the cryptography-as-a-service API.

4. The computer-implemented method of claim 1, further comprising:
receiving, by the computing system and from the second user device, a fourth request to access the cryptographic key management service API; and
generating an access error by a data protection service based on a determination that the fourth request was received via the external gateway.

5. The computer-implemented method of claim 1, further comprising: providing access to one of an encryption service or a digital signing service.

6. A non-transitory computer-readable storage medium comprising instructions that, when executed, cause a computing system to:
receive, from a first user device, a first request to access a cryptographic key management service;
determine whether the first request to access the cryptographic key management service was received via an internal gateway or an external gateway, wherein;
the internal gateway is configured to authenticate an internal user, via an internal interface, thereby allowing the internal user to create, use, and retrieve cryptographic key pairs by accessing at least one of a cryptography-as-a-service application programming interface (API) or a cryptographic key management API, and
the external gateway is configured to authenticate an external user, via an external interface, thereby allowing the external user to retrieve public keys by accessing the cryptographic key management API, wherein the external user is prevented from accessing the cryptographic key management API;

provide, based on a determination that the first request was received via the internal gateway, access to the cryptographic key management API;

receive, from the first user device and by the cryptographic key management API, a second request to update a key management setting for a first key pair;

update, in a secure memory and based on the request to update the key management setting, key metadata for the first key pair, wherein the updated key metadata comprises updated key rotation data;

receive, from a second user device and by the cryptography-as-a-service API, a third request to perform a cryptographic operation associated with the first key pair;

determine whether the cryptographic operation associated with the first key pair is permitted based on the updated key metadata for the first key pair;

retrieve, from the secure memory and based on a determination that the cryptographic operation is permitted, one or more encryption keys corresponding to the first key pair;

perform the cryptographic operation using the retrieved one or more encryption keys corresponding to the first key pair;

determine, based on the third request to perform the cryptographic operation and the updated key metadata for the first key pair, that the one or more encryption keys should be updated;

update, using a key rotation service, the one or more encryption keys; and store the one or more updated encryption keys in the secure memory.

7. The non-transitory computer-readable storage medium of claim 6, further comprising instructions that, when executed, cause the computing system to:

receive an update from the internal user, by the cryptographic key management API, to a key management setting or policy that changes a functionality of the cryptography-as-a-service API.

8. The non-transitory computer-readable storage medium of claim 6, further comprising instructions that, when executed, cause the computing system to:

receive an update from the internal user, by the cryptographic key management API, to change a time period where a functionality of the cryptography-as-a-service API may be accessed.

9. The non-transitory computer-readable storage medium of claim 8, wherein the time period is session based such that the functionality of the cryptography-as-a-service API may be accessed during the session and the session is authorized to allow a subset of cryptographic operations of the cryptography-as-a-service API of all available cryptographic operations.

10. A device comprising:
one or more processors; and
memory storing instructions that, when executed by the one or more processors, cause the device to:
receive, from a first user device, a first request to access a cryptographic key management service;
determine whether the first request to access the cryptographic key management service was received via an internal gateway or an external gateway, wherein;
the internal gateway is configured to authenticate an internal user, via an internal interface, thereby allowing the internal user to create, use, and retrieve cryptographic key pairs by accessing at least one of a cryptography-as-a-service application programming interface (API) or a cryptographic key management API, and the external gateway is configured to authenticate an external user, via an external interface, thereby allowing the external user to retrieve public keys by accessing the cryptography-as-a-service API, wherein the external user is prevented from accessing the cryptographic key management API;

provide, based on a determination that the first request was received via the internal gateway, access to the cryptographic key management API;

receive, from the first user device and by the cryptographic key management API, a second request to update a key management setting for a first key pair;

update, in a secure memory and based on the second request to update the key management setting, key metadata for the first key pair, wherein the updated key metadata comprises updated key rotation data;

receive, from a second user device and by the cryptography-as-a-service API, a third request to perform a cryptographic operation associated with the first key pair;

determine whether the cryptographic operation associated with the first key pair is permitted based on the updated key metadata for the first key pair;

retrieve, from the secure memory and based on a determination that the cryptographic operation is permitted, one or more encryption keys corresponding to the first key pair;

perform the cryptographic operation using the retrieved one or more encryption keys corresponding to the first key pair;

determine, based on the third request to perform the cryptographic operation and the key updated metadata for the first key pair, that the one or more encryption keys should be updated;

update, using a key rotation service, the one or more encryption keys; and store the one or more updated encryption keys in the secure memory.

11. The device of claim 10, wherein determining whether the cryptographic operation is permitted is further based on determining whether the third request to perform the cryptographic operation associated with the first key pair was received via the internal gateway or the external gateway.

12. The device of claim 10, wherein the second request to update the key management setting for the first key pair further comprises requesting to update a key rotation interval associated with the first key pair.

13. The device of claim 10, wherein the second request to update the key management setting for the first key pair further comprises requesting to update a key rotation interval associated with the first key pair such that the key rotation interval comprises a longer time period for additional requests received via the internal gateway than the additional requests received via the external gateway.

14. The device of claim 10, wherein the cryptographic key management API is configured to allow updates to a key management setting or policy that changes a functionality of the cryptography-as-a-service API.

15. The device of claim 10, wherein the cryptographic key management API is configured to allow updates to a key management setting or policy that changes a compliance enforcement of at least one compliance requirement of one or more policies.

16. The device of claim 10, wherein the cryptographic key management API is configured to allow updates to a key management setting or policy that changes a time period where a functionality of the cryptography-as-a-service API may be accessed.

17. The device of claim 16, wherein the time period for the internal user is longer than that of the external user.

18. The device of claim 16, wherein the time period is session based such that the functionality of the cryptography-as-a-service API may be accessed during the session.

19. The device of claim 18, wherein the session is authorized to allow a subset of cryptographic operations of the cryptography-as-a-service API of all available cryptographic operations.

20. The device of claim 10, wherein the instructions, when executed by the one or more processors, cause the device to:
   receive, from a third user device, a fourth request; and
   based on the fourth request, authenticate a user of the third user device as an external user.

21. The device of claim 10, wherein the instructions, when executed by the one or more processors, cause the device to:
   generate, based on authenticating the second user as an external user, an access error.

22. The device of claim 10, wherein the cryptography-as-a-service API is configured to provide access to one of an encryption service or a digital signing service.

\* \* \* \* \*